(12) United States Patent
Miyazaki et al.

(10) Patent No.: US 6,717,390 B2
(45) Date of Patent: Apr. 6, 2004

(54) SWITCHING POWER SUPPLY

(75) Inventors: Hiroshi Miyazaki, Tokyo (JP); Ken Matsuura, Tokyo (JP); Masahiko Hirokawa, Tokyo (JP)

(73) Assignee: TDK Corporation, Tokyo (JP)

( * ) Notice: Subject to any disclaimer, the term of this patent is extended or adjusted under 35 U.S.C. 154(b) by 49 days.

(21) Appl. No.: 10/219,679

(22) Filed: Aug. 16, 2002

(65) Prior Publication Data
US 2003/0039129 A1 Feb. 27, 2003

(30) Foreign Application Priority Data
Aug. 17, 2001 (JP) ........................................ 2001-248255

(51) Int. Cl.[7] ................................................. G05F 1/40
(52) U.S. Cl. ....................................... 323/286; 323/284
(58) Field of Search ................................ 323/282, 284, 323/285, 286; 363/53, 56.01

(56) References Cited

U.S. PATENT DOCUMENTS

| 5,406,468 A | 4/1995 | Booth |
| 6,229,292 B1 | 5/2001 | Redl et al. |
| 6,232,755 B1 | 5/2001 | Zhang |
| 6,541,948 B1 * | 4/2003 | Wong .......................... 323/284 |
| 6,642,696 B2 * | 11/2003 | Tateishi ....................... 323/222 |

FOREIGN PATENT DOCUMENTS

JP  2001-112250  4/2001

* cited by examiner

Primary Examiner—Jessica Han
(74) Attorney, Agent, or Firm—Oblon, Spivak, McClelland, Maier & Neustadt, P.C.

(57) ABSTRACT

The switching power supply comprises a main circuit having a switching circuit for converting a DC input voltage to an AC voltage and an output circuit for rectifying the AC voltage to generate a DC output voltage, a control circuit for controlling the operation of the main circuit, and an abrupt load change detector circuit for detecting an abrupt change in the load current supplied from the main circuit, characterized in that the abrupt load change detector circuit comprises a first filter and a second filter for receiving the output voltage and detection signal generating means for generating an abrupt load change detection signal based on the outputs of the first filter and the second filter. This eliminates a power loss or operation delay caused when a resistor or a current transformer is used to directly detect the output current. Proper use of an abrupt load change detection signal allows dramatic improvement in transient response.

22 Claims, 16 Drawing Sheets

SWITCHING POWER SUPPLY

BACKGROUND OF THE INVENTION

The present invention relates to switching power supplies, in particular to switching power supplies suitable for driving a load where a load current may abruptly vary.

Conventionally, a so-called DC-to-DC converter is known as a switching power supply. A representative DC-to-DC converter converts DC input into AC output by using a switching circuit, then transforming (performing step-up or step-down) the resulting AC output by the use of a transformer. It then converts the AC output to a DC output by the use of an output circuit thus obtaining a DC output different from the input voltage.

In such switching power supply, output voltage is detected by a control circuit, and the switching operation is controlled by a switching circuit based on the detected output voltage. This supplies a stable operating voltage to a load that is to be driven by the switching power supply.

When a load is driven where the load current (output current at the switching power supply) abruptly changes, switching power supplies of related art have difficulties in maintaining a stable output voltage.

In particular, a CPU (Central Processing Unit) or a DSP. (Digital Signal Processor) has, in the active state, a low operating voltage with high current while a small current in the inactive state. Thus, in existing switching power supply, an abrupt change in the output current could cause a large change in the output voltage. The CPU or DSP is a device featuring very high-speed operation so that a change in the output voltage may cause malfunction unless the output voltage is stabilized without delay.

SUMMARY OF THE INVENTION

This invention is to provide a switching power supply suitable for driving the load where load current may change abruptly.

Another object of the invention is to provide a switching power supply where a change in the output voltage caused by an abrupt change in the output current is reduced.

At last, the invention is to provide a switching power supply that can effectively detect the abrupt change in the output current.

The switching power supply in this invention comprises: a main circuit having a switching circuit for converting the DC input voltage to an AC voltage, an output circuit for rectifying the AC voltage to generate a DC output voltage; a control circuit for controlling the operation of the main circuit; an abrupt load change detector circuit for detecting an abrupt change in the load current supplied from the main circuit, the abrupt load change detector circuit including the first filter and the second filter for receiving the output voltage, and a detection signal generating means for generating an abrupt load change detection signal based on the outputs of the first filter and the second filter.

According to the invention, an abrupt change in the load current supplied from the main circuit is detected based on the outputs of the first filter and the second filter receiving the output voltage. This eliminates a power loss or operation delay caused when a resistor or a current transformer is used to directly detect the output current. Proper use of an abrupt load change detection signal allows dramatic improvement in transient response.

In the preferable embodiment of the invention, the time constant of the first filter and the second filter differ from each other.

In a further preferred embodiment of the invention, the first filter and the second filter are either a low-pass or a high-pass filter.

In a further preferred embodiment of the invention, the detection signal generating means is comprised of a comparator for receiving the output of the first filter at one input terminal and the output of the second filter at the other input terminal.

In a further preferred embodiment of the invention, in normal state, the output voltage levels of the first filter and the second filter differ from each other.

In another preferred embodiment of the invention, the detection signal generating means is comprised of an operational amplifier for amplifying the output voltage level difference between the first filter and the second filter and of a comparator for activating the abrupt load change detection signal in response to the output of the operational amplifier exceeding a predetermined threshold voltage.

According to the preferred embodiment of the invention, the operational amplifier for amplifying the output voltage level difference between the first filter and the second filter makes it is possible to detect the abrupt load change state more accurately and steadily.

In another preferred embodiment of the invention, the predetermined threshold voltage is associated with the output voltage.

According to the preferred embodiment of the invention, it is not necessary to change the control in the abrupt load change detector circuit even when the target voltage for the output voltage is changed.

In another preferred embodiment of the invention, the output voltage level of the first filter in normal state is substantially equal to that of the second filter.

In another preferred embodiment of the invention, the control circuit has at least an amplifier for receiving the output voltage or a voltage associated with the output voltage at its input terminal and the abrupt load change detector circuit comprises a means for varying the level at the input terminal of the amplifier in response to the activation of the abrupt load change detection signal.

According to the preferred embodiment of the invention, since it is possible to promptly recover from an abrupt change in the output voltage caused by an abrupt change in the load state, there is a dramatic improvement in transient response. This effectively prevents malfunction of the load caused by a change in the supply voltage even when a CPU or DSP is the load.

In another preferred embodiment of the invention, the control circuit has a variable amplifier that receives, at its input terminal, the output voltage or a voltage associated with the output voltage. The circuit has a variable amplifier where it switches the characteristics based on the abrupt load change detection signal.

According to the preferred embodiment of the invention, since it is possible to promptly recover from an abrupt change in the output voltage caused by an abrupt change in the load state, a dramatic improvement in transient response can be seen.

In another preferred embodiment of the invention, the control circuit comprises several amplifiers having different characteristics for receiving, at its respective input terminals, the output voltage or a voltage associated with the output voltage, several PWM control circuits for generating corresponding control signal groups based on the outputs of the corresponding amplifiers, and a selector for choosing one of the control signal groups based on the abrupt load change detection signal, thereby controlling the operation of the main circuit based on the selected control signal group.

According to the preferred embodiment of the invention, it is possible that by promptly recovering from an abrupt change in the output voltage caused by an abrupt change in the load, dramatic improvements in transient response can be seen.

In another preferred embodiment of the invention, the control circuit comprises at lease several amplifiers having different characteristics for receiving at its respective input terminals, an output voltage or a voltage associated with the output voltage, a selector for choosing one of the outputs of several amplifiers based on the abrupt load change detection signal, and a PWM control circuits for generating control signal groups based on the selected output, thereby controlling the operation of the main circuit based on the control signal group.

According to the preferred embodiment of the invention, it is possible that by promptly recovering from an abrupt change in the output voltage caused by an abrupt change in the load state, dramatic improvement in transient response can be seen.

In another preferred embodiment of the invention, the control circuit forcefully places the output circuit of the main circuit in a synchronous rectification state or in a halt state of synchronous rectification in response to the abrupt load change detection signal being active.

According to the preferred embodiment of the invention, it is possible that by promptly recovering from an abrupt change in the output voltage caused by an abrupt change in the load state, dramatic improvement in transient response can be seen.

In another aspect, the switching power supply invented comprises: a main circuit having a switching circuit for converting the DC input voltage to an AC voltage, an output circuit for rectifying the AC voltage to generate a DC output voltage; a control circuit for controlling the operation of the main circuit; an abrupt load change detector circuit for detecting an abrupt change in the load current supplied from the main circuit, an abrupt load change detector circuit which includes the first, second and third filters for receiving the output voltage, the first comparator for receiving both the output of the first filter at one input terminal and the output of the second filter at the other input terminal which generates abrupt load change detection signal 1 based on these outputs and the second comparator for receiving the output of the first filter at one input terminal and the output of the third filter at the other input terminal which generates abrupt load change detection signal 2 based on these outputs.

According to the invention, since the first comparator for generating abrupt load change detection signal 1 and the second comparator for generating abrupt load change detection signal 2 are used, proper setting of the characteristics of the first, second and third filters allows detection of the abrupt load change state (for example an abrupt increase in load) in one direction as well as the abrupt load change state in the opposite of the one direction(for example an abrupt drop in load). Proper setting of the characteristics of the first, second and third filters also allows detection that is dependent on the degree of abrupt load change. By proper use of abrupt load change detection signals 1 and 2, it is possible to dramatically improve transient response.

In a preferred embodiment of the invention, the output voltage levels of the first filter and the second filter in normal state differ from each other, and the output voltage levels of the first and third filters in normal state also differ from each other.

In a further preferred embodiment of the invention, the control circuit has at least an amplifier for receiving, at its input terminal, the output voltage or a voltage associated with the output voltage, and the abrupt load change detector circuit includes means for varying the level at the input terminal of the amplifier in one direction in response to the activation of abrupt load change detection signal 1 and varying the level at the input terminal of the amplifier in the opposite of the one direction in response to the activation of abrupt load change detection signal 2.

According to the preferred embodiment of the invention also, it is possible to promptly recover from an abrupt change in the output voltage caused by an abrupt change in the load state, which dramatically improves transient response.

A switching power supply of the third aspect of the invention comprises: a main circuit having a switching circuit for converting the DC input voltage to an AC voltage, an output circuit for rectifying the AC voltage to generate a DC output voltage; a control circuit for controlling the operation of the main circuit; an abrupt load change detector circuit for detecting an abrupt change in the load current supplied from the main circuit, the abrupt load change detector circuit that includes the first filter and the second filter for receiving the output voltage, an operational amplifier for amplifying the output voltage level difference between the first filter and the second filter, the first comparator for activating the abrupt load change detection signal 1 in response to the output of the operational amplifier when threshold voltage 1 is exceeded, and the second comparator for activating abrupt load change detection signal 2 in response to the output of the operational amplifier when threshold voltage 2 is exceeded.

According to the invention, since the first comparator for generating abrupt load change detection signal 1 and the second comparator for generating abrupt load change detection signal 2 are used, proper setting of the threshold voltages of the first filter and the second filter allows detection of the abrupt load change state (for example an abrupt increase in load) in one direction as well as the abrupt load change state in the opposite of the one direction (for example an abrupt drop in load). Proper setting of the threshold voltages of the first filter and the second filter also allows detection that is dependent on the degree of abrupt load change. By proper use of abrupt load change detection signals 1 and 2, it is possible to dramatically improve transient response.

In a preferred embodiment of the invention, both threshold voltages 1 and 2 are associated with the output voltage.

In another preferred embodiment of the invention, it is not necessary to change the control in the abrupt load change detector circuit even when the target voltage for the output voltage is changed.

In a further preferred embodiment of the invention, threshold voltage 1 is lower than the output level of the operational amplifier in normal state and threshold voltage 2 is higher than the output voltage level of the operational amplifier in normal state.

In a further preferred embodiment of the invention, it is possible to detect the abrupt load change state (for example an abrupt increase in load) in one direction as well as the abrupt load change state in the opposite of the one direction (for example an abrupt drop in load).

In a further preferred embodiment of the invention, the control circuit has at least an amplifier that receives, at its input terminal, the output voltage or a voltage associated with the output voltage, and the abrupt load change detector circuit includes means for varying the level at the input terminal of the amplifier in one direction in response to activation of abrupt load change detection signal 1 and varying the level at the input terminal of the amplifier in the opposite of the one direction in response to activation of abrupt load change detection signal 2.

According to the preferred embodiment of the invention, it is possible to promptly recover from an abrupt change in the output voltage caused by an abrupt change in the load state, which dramatically improves transient response.

In a further preferred embodiment of the invention, threshold voltages 1 and 2 are either lower or higher than the output voltage level of the operational amplifier in normal state.

In a further preferred embodiment of the invention, it is possible to perform detection that is dependent on the degree of abrupt load change.

In a further preferred embodiment of the invention, the control circuit has at least an amplifier that receives, at its input terminal, the output voltage or a voltage associated with the output voltage and the abrupt load change detector circuit including means for varying the level at the input terminal of the amplifier at rate 1 in one direction in response to activation of abrupt load change detection signal 1 and varying the level at the input terminal of the amplifier at a rate 2 in response to activation of abrupt load change detection signal 2.

According to the preferred embodiment of the invention, it is possible to promptly recover from an abrupt change in the output voltage caused by an abrupt change in the load, which dramatically improves transient response.

DETAILED DESCRIPTION OF THE PREFERRED EMBODIMENTS

Preferred embodiments of the invention will be explained, referencing the attached drawings.

First Embodiment

Figure 1:
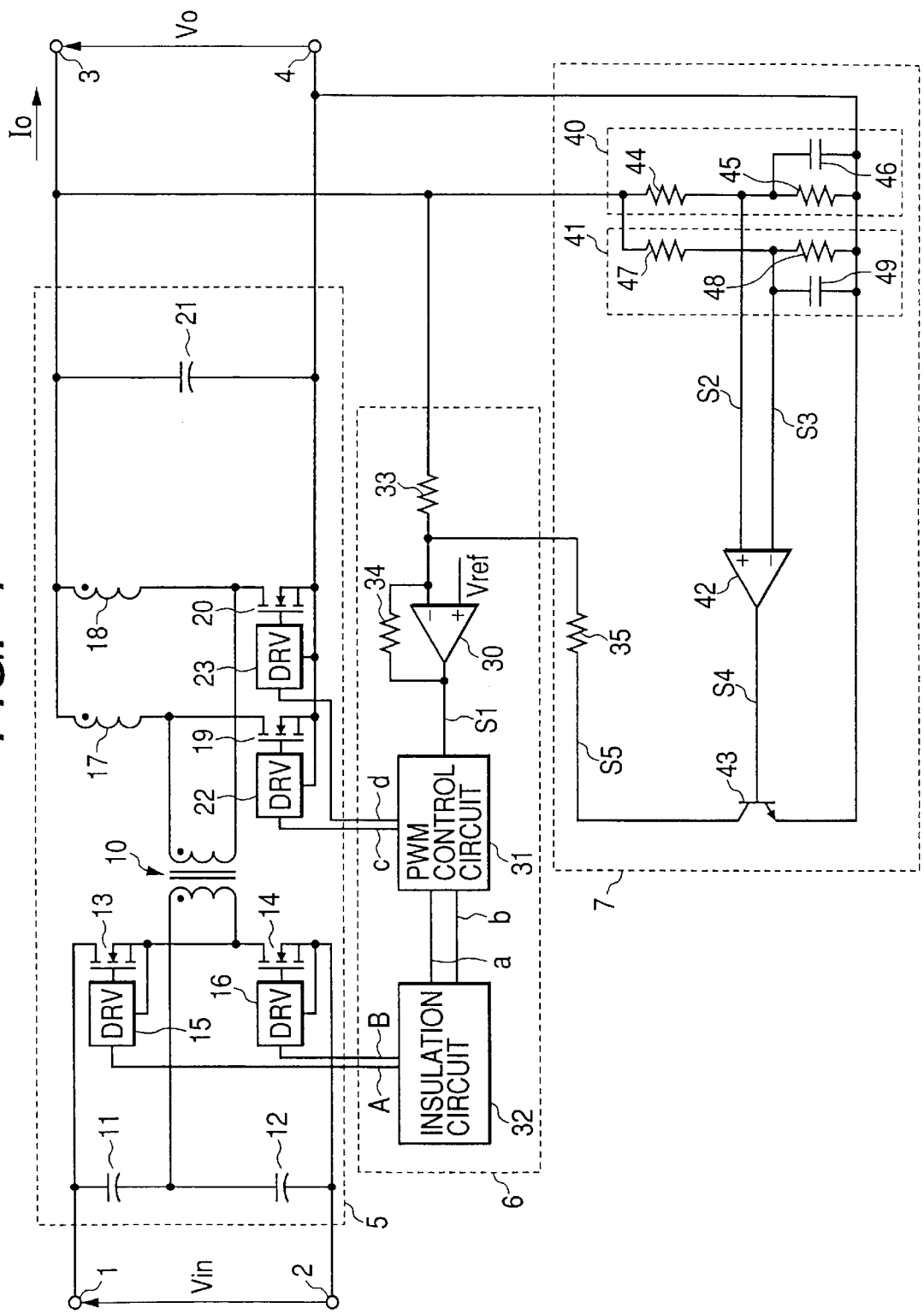
FIG. 1 is a circuit diagram of the switching power supply according to the first embodiment of the invention.

FIG. 1 is a circuit diagram of the switching power supply according to the first embodiment of the invention.

As shown in FIG. 1, the switching supply related to this embodiment is for transforming a DC input voltage Vin supplied to input terminals 1 and 2 and supplying an output voltage Vo having a predetermined voltage value to output terminals 3 and 4, and is comprised of of main circuit 5, control circuit 6, and abrupt load change detector circuit 7. Although not limited to, to terminal 3 and 4, a power terminal of a device operating on a low voltage such as CPU and DSP (for example 1 V), or a equipment requiring large current (for example 100 A), is connected. The CPU or DSP requires a large current in the active state while requiring only a small current in the inactive state and its switching speed between the active and inactive state is extremely rapid. Switching power supply according to this embodiment is preferably used as a power supply for driving a device (load) having such characteristics.

Main circuit 5 comprises transformer 10, a half-bridge-type switching circuit provided on the primary side of transformer 10, and a current-doubler-type output circuit provided on the secondary side of transformer 10.

The switching power supply included in main circuit 5 comprises first input capacitor 11 and second input capacitor 12 serially connected between input terminals 1 and 2, first main switch 13 and second main switch 14 serially connected between input terminals 1 and 2, driver 15 for driving first main switch 13, and driver 16 for driving second main switch 14. As shown in FIG. 1, the primary winding of transformer 10 is connected between the connecting point of first and second input capacitors 11, 12 and the connecting point of first and second main switches 13, 14. Various well-known elements or circuits can be applied to first and second main switches 13.

The output circuit included in main circuit 5 comprises first inductor 17 and first rectifier switch 19 serially connected between output terminals 3 and 4, second inductor 18 and second rectifier switch 20 serially connected between output terminals 3 and 4, output capacitor 21 connected between output terminals 3 and 4, driver 22 for driving the first rectifier switch 19, and driver 23 for driving first rectifier switch 20. As shown in FIG. 1, the secondary wiring of transformer 10 is connected between the connecting point of first inductor 17 and first rectifier switch 19 and the connecting point of second inductor 18 and second rectifier switch 20. Various well-known elements or circuits can be applied to first and second rectifier switches 19 and 20.

Control circuit 6 comprises amplifier 30, PWM control circuit 31, isolation circuit 32, and resistors 33 and 34.

Amplifier 30 comprises an inverted input terminal (−), a non-inverted input terminal (+) and an output terminal. Between the inverted input terminal (−) and one output terminal 3 of the switching power supply, resistor 33 is inserted. Between the inverted input terminal (−) and the output terminal, resistor 34 is inserted. To the non-inverted input terminal (+), reference voltage Vref is supplied. As a result, control signal S1 present at the output terminal of amplifier 30 varies depending on output voltage Vo present at output terminal 3. More specifically, the higher output voltage Vo, the lower the level of control signal S1 present at the output terminal of amplifier 30. Lower output voltage Vo is, the higher the level of control signal S1 present at the output terminal of amplifier 30.

PWM control circuit 31 receives control signal S1 supplied from amplifier 30 and based on this, controls the pulse widths of control signals a, b. More specifically, PWM control circuit 31 increases the pulse widths (increasing duty) of control signals a, b as the level of control signal S11 becomes higher. PWM control circuit 31 reduces the pulse widths (decreasing duty) of control signals a, b as the level of control signal S11 becomes lower. Control signals a, b are signals used to control on/off of first main switch 13 and second main switch 14, respectively. PWM control circuit 31 adjusts control signals c, d to the proper pulse widths depending on the pulse widths of control signals a, b. Control signals c and d are signals used to control on/off of first rectifier switch 19 and second rectifier switch 20, respectively.

Isolation circuit 32 is a circuit for receiving control signals a, b that from the secondary side of transformer 10 and transforming these signals to control signals A, B for the primary side of transformer 10. Although not limited thereto, isolation circuit 32 may be either a transformer or an opto-coupler.

As shown in FIG. 1, control signal A is supplied to driver 15, control signal B to driver 16, control signal c to driver 22, and control signal d to driver 23. These drivers place the corresponding switch in the conductive state when the control signal is active (for example High). The drivers place the corresponding switch in the non-conductive state when the control signal is inactive (for example Low).

Abrupt load change detector circuit 7 comprises filter 40, filter 41, comparator 42, transistor 43, and resistor 35.

Filter 40 comprises resistors 44 and 45 serially connected between output terminals 3 and 4 and capacitor 46 connected in parallel with resistor 45. The voltage of the connecting point of resistor 44 and 45 is applied as control signal S2. Similarly, filter 41 comprises resistors 47 and 45 serially connected between output terminals 3 and 4 and capacitor 49 connected in parallel with resistor 48. The voltage of the connecting point of resistor 47 and resistor 48 is applied as control signal S3. With this configuration, filter 40 works as a low-pass filter circuit receiving output voltage Vo as an input and exerting control signal S2 while filter 41 works as a low-pass filter circuit receiving output voltage Vo as an input and exerting control signal S3.

The filter characteristics of filter 40 and filter 41 differ from each other. More specifically, the setting is made so that filter 40 will have a larger time constant than filter 41. When output voltage Vo varies, filter 41 is subject to a larger change than filter 40. Setting is made so that when output voltage Vo is stable or when output voltage Vo is subject to a small change, output control signal S2 of filter 40 will be at a lower level than output control signal S3 of filter 41. Setting of such characteristics is made by properly selecting the constants for resistors 44, 45, 47 and 48 as well as capacitors 46 and 49, all constituting to filters 40 and 41.

Comparator 42 comprises an inverted input terminal (−), a non-inverted input terminal (+) and an output terminal. Control signal S2 is supplied to the non-inverted input terminal (+) and control signal S3 is supplied to the inverted input terminal (−). As a result, when the level of control signal S2 is lower than the level of control signal S3, output control signal S4 of comparator 42 goes Low. When the level of control signal S2 is higher than the level of control signal S3, output control signal S4 of comparator 42 goes High. Control signal S4 is used as an abrupt load change detection signal.

Although not limited to, transistor 43 comprises an NPN-type bipolar transistor. Control signal S4 is supplied to the base. An emitter of transistor 43 is connected to output terminal 4 (GND). A collector of transistor 43 is connected to the inverted input terminal (−) of amplifier 30 via resistor 35.

Next, operation of the switching power supply according to this embodiment in the abrupt load change state will be described. The term "abrupt load change state" refers to a state where output current Vo is under abrupt change.

Figure 2:
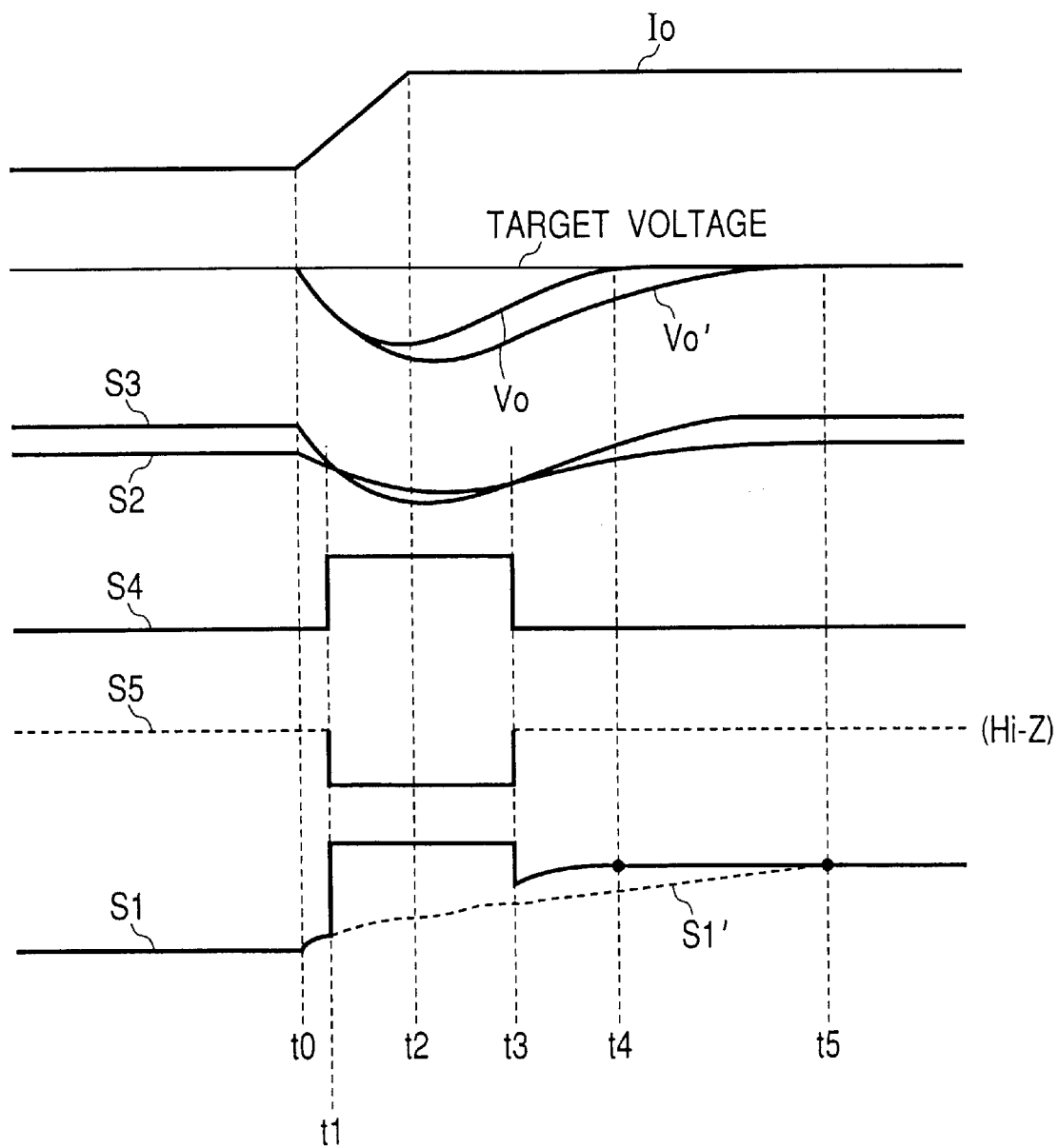
FIG. 2 is a timing chart showing the operation of the switching power supply, shown in FIG. 1, in the abrupt load change state.

FIG. 2 is a timing chart showing the operation of the switching power supply in the abrupt load change state according to this embodiment.

FIG. 2 shows the assumed operation of the switching power supply when output current Io has increased abruptly between time t1 and time t2. This phenomenon occurs when a load, a CPU or DSP, connected to output terminals 3 and 4 has switched from inactive to active state.

Before time t0, the value of output current Io is small and its change is negligible. Therefore, output voltage Vo maintains the target voltage. In this case, output control signal S2 of filter 40 is at a lower level than output control signal S3 of filter 41. Therefore, control signal S4 of comparator 42 remains low. This keeps transistor 43 off, so that control signal S5 is in a high impedance state at the inverted input terminal (−) of amplifier 30. Therefore, before time t0, abrupt load change detector circuit 7 has no substantial influence on the operation of control circuit 6.

Next, when output current Io starts to rise abruptly at time t0, output voltage Vo starts to drop abruptly. When output voltage Vo starts to drop abruptly, filter 40 for receiving the voltage lowers the level of output control signal S2 while filter 41 lowers the level of output control signal S3. In this case, in response to a change in output voltage Vo, the setting is made so that output control signal S3 of filter 41 varies greatly compared to output control signal S2 of filter 40. Thus, the level of control signal S2 compared with that of control signal S3 is reversed at time t1; that is, control signal S2 is at a higher level than control signal S3.

This drives control signal S4 of comparator 42 High and turns on transistor 43. When transistor 43 is turned on, the level of control signal S5 becomes the voltage of output terminal 4 (GND). This supplies a ground to the inverted input terminal (−) of amplifier 30 via resistor 35.

This abruptly elevates the level of output control signal S1 of amplifier 30, typically to a saturation level. Thus, PWM control circuit 31 for receiving control signal S1 substantially increases the pulse widths of control signal a, b as to a maximum value thereby causing the low level of output voltage Vo to abruptly rise toward the target voltage. Such a state is maintained until the level of control signal S2 compared with the level of control signal S3 is reversed. In other words, the level of control signal S2 becomes lower than that of control signal S3.

When control signal S2 is at a lower level than control signal S3 at time t3, output control signal S4 of comparator 42 returns to a low level, turning off transistor 43 again. Thus, abrupt load change detector circuit 7 has no substantial influence on the operation of control circuit 6. Then, the level of output voltage Vo is recovered to the target voltage at time t4, which stabilizes the level of control signal S1.

With the foregoing operation for the switching power supply according to this embodiment, it is possible to promptly recover from an abrupt drop in output voltage Vo caused by an abrupt change in the load state, which dramatically improves transient response.

In FIG. 2, the waveforms of output voltage Vo and control signal S1 obtained when abrupt load change detector circuit 7 is removed from the switching power supply according to this embodiment are shown as Vo' and S1'. As understood from FIG. 2, when abrupt load change detector circuit 7 is removed from the switching power supply according to this embodiment, the rise in control signal S1 is smooth even when output voltage Vo has dropped abruptly due to an abrupt change in the load. This results in a longer time to restore the level of output voltage Vo to the target voltage. In this example, when the level of output voltage Vo is recovered to the target voltage at time t5, the level of control signal S1 is stabilized.

In switching power supply according to this embodiment, when output voltage Vo has dropped abruptly due to an abrupt change in the load state, it is possible to recover the level of output voltage Vo faster by time t5 minus t4 than when abrupt load change detector circuit 7 is omitted.

Operation of the switching power supply according to this embodiment in normal state will be described. The term "normal state" refers to a state where the variation in output current Io is small when output current Io is stable or, even when varying; in other words, state excluding the abrupt load change state.

Figure 3:
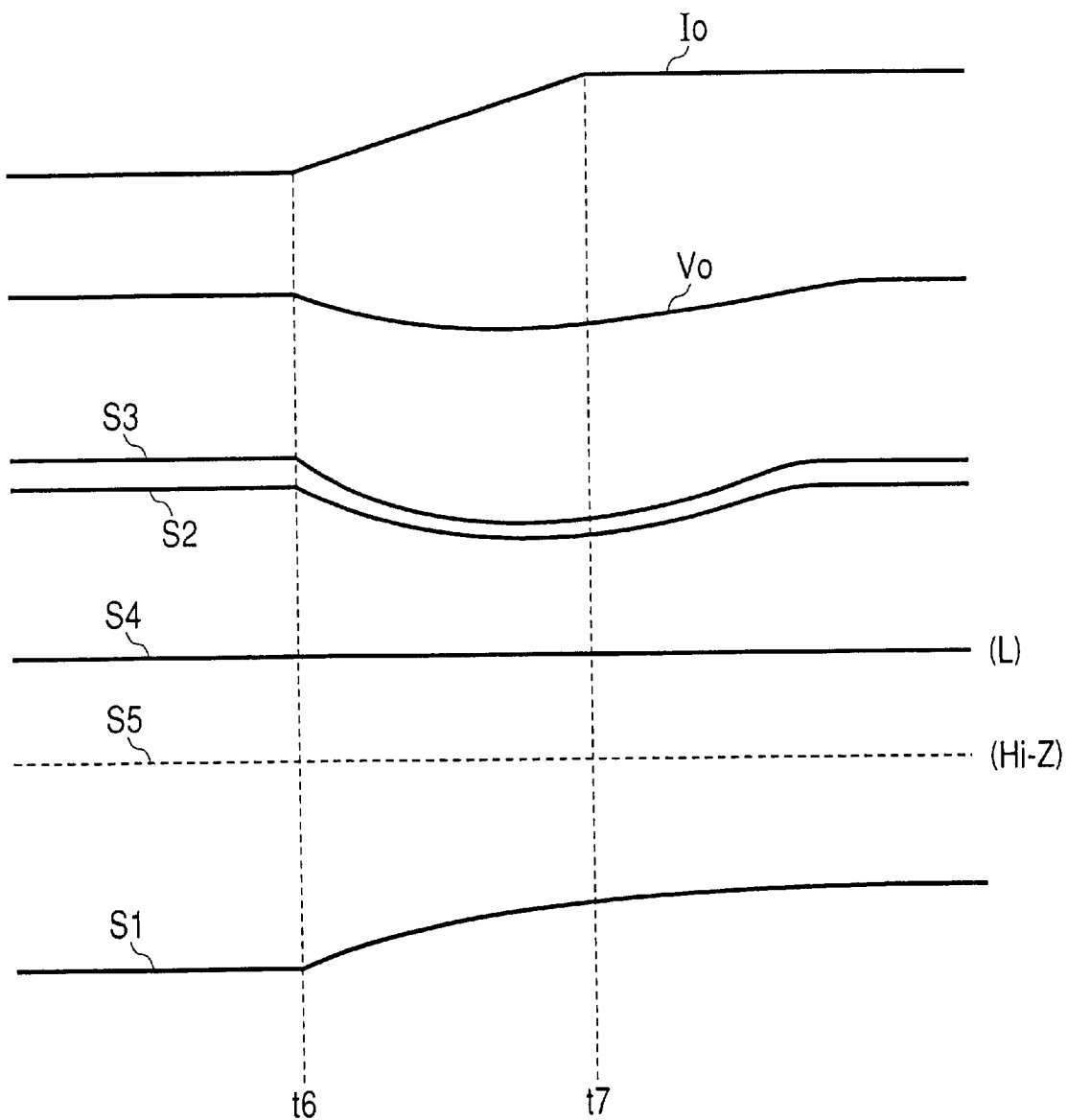
FIG. 3 is a timing chart showing the operation of the switching power supply, shown in FIG. 1, in normal state.

FIG. 3 is a timing chart showing the operation of the switching power supply according to this embodiment in normal state. FIG. 3 shows the assumed operation of the switching power supply when the amount of output current Io has increased relatively smoothly between time t6 and time t7 (time t7−time t6<time t2−time t0).

When the amount of output current Io increases relatively smoothly as shown in FIG. 3, the corresponding drop in output voltage Vo is also smooth and the level of control signal S2 compared with that of control signal S3 is not reversed. Thus, output control signal S4 of comparator 42 remains Low while transistor 43 remains off. As stated earlier, when transistor 43 is off, abrupt load change detector circuit 7 has no substantial influence on the operation of control circuit 6. Thus, the switching power supply according to this embodiment is capable of performing normal operation in normal state.

As said above, in switching power supply according to this embodiment, it is possible to promptly recover from an abrupt drop in output voltage Vo caused by an abrupt change in the load state. Thus it is possible to effectively prevent malfunction of the load caused by a change in the supply voltage even when a CPU or DSP is the load.

In switching power supply according to this embodiment, filters 40 and 41 having features of low-pass filters are used.

Therefore, it is possible to avoid malfunction caused by inadvertent recognition of a ripple voltage change that accompanies the switching operation of main circuit 5 as an abrupt load change.

Means for promptly recovering from an abrupt drop in output voltage Vo caused by an abrupt load change may include a means for using a large-capacity capacitor as output capacitor 21. Such an approach results in an increase in the size of the entire switching power supply that adds to costs. Using switching power supply according to this embodiment effectively suppresses increase in size and costs of the entire equipment while promptly recovering from an abrupt drop in output voltage Vo caused by an abrupt change in the load state.

Second Embodiment

Next, another preferred embodiment of the invention will be described.

Figure 4:
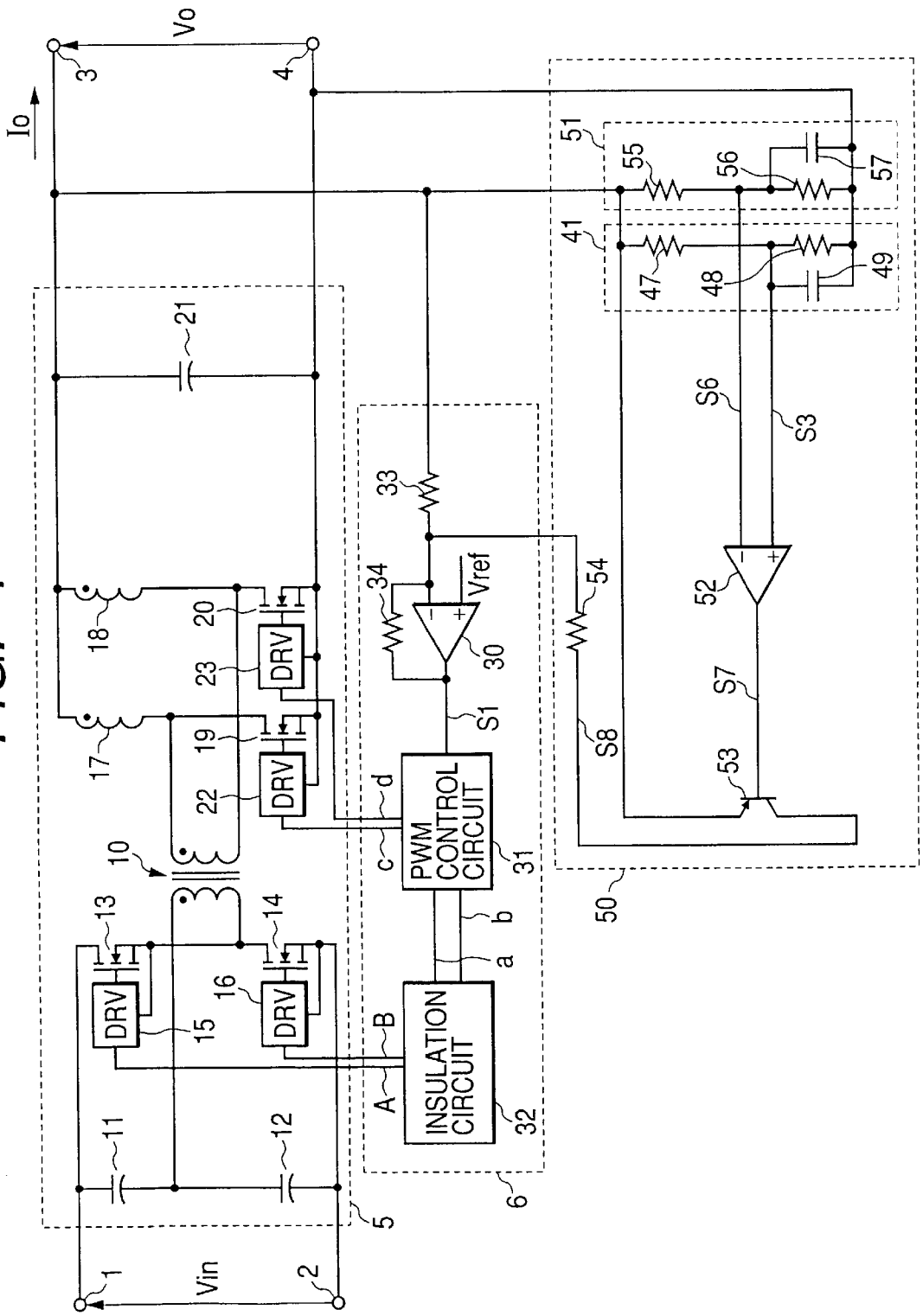
FIG. 4 is a circuit diagram of the switching power supply according to the second embodiment of the invention.

FIG. 4 is a circuit diagram of the switching power supply according to the second embodiment of the invention.

As shown in FIG. 4, the switching power supply according to this embodiment differs from the switching power supply shown in FIG. 1 in that abrupt load change detector circuit 7 is replaced with abrupt load change detector circuit 50. Other configuration are the same as the switching power supply shown in FIG. 1 so any corresponding description shall be omitted.

Abrupt load change detector circuit 50 comprises filter 41, filter 51, comparator 52, transistor 53, and resistor 54.

Filter 51 comprises resistors 55 and 56 serially connected between output terminals 3 and 4 and capacitor 57 connected in parallel with resistor 56. The voltage of the connecting point of resistor 55 and 56 is used as control signal S6. With this configuration, filter 51 works as a low-pass filter circuit receiving output voltage Vo as an input and exerting control signal S6. Circuit configuration and feature of filter 41 has been said earlier.

The characteristics of filter 41 and filter 51 differ from each other. More specifically, setting is made so that filter 41 will have a larger time constant than filter 51. Thus, when output voltage Vo has varied, filter 51 is subject to a larger change than filter 41. Setting is made so that, when output voltage Vo is stable or is subject to a small change, output control signal S6 of filter 51 will be at a lower level than output control signal S3 of filter 41. Setting of such characteristics is made by properly selecting the constants for resistors 47, 48, 55 and 56 as well as capacitors 49 and 57, all constituting filters 41 and 51.

Comparator 52 comprises an inverted input terminal (−), a non-inverted input terminal (+) and an output terminal. Control signal S3 is supplied to the non-inverted input terminal (+) and control signal s6 is supplied to the inverted input terminal (−). As a result, when the level of the control signal S6 is lower than the level of control signal S3, output control signal S7 of comparator 52 goes High. When the level of control signal S6 is higher than the level of control signal S3, output control signal S7 of comparator 52 goes Low. Control signal S7 is used as an abrupt load change detection signal.

Transistor 53, although not limited thereto, comprises a PNP-type bipolar transistor, where control signal S7 is supplied to the base. An emitter of transistor 53 is connected to output terminal 3 (Vo). A collector of transistor 53 is connected to the inverted input terminal (−) of amplifier 30 via resistor 54.

Next, operation of the switching power supply according to this embodiment in the abrupt load change state will be described.

Figure 5:
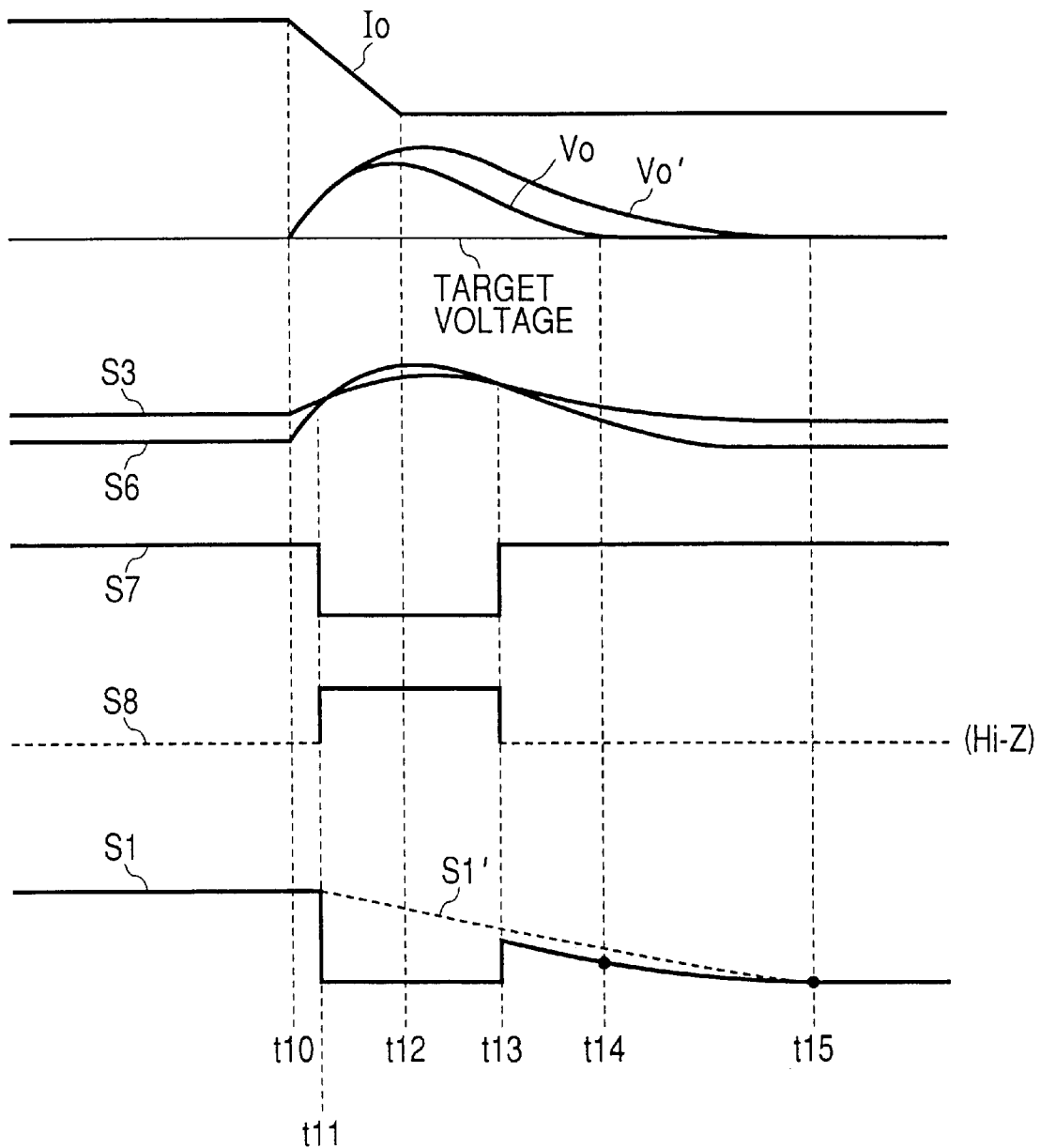
FIG. 5 is a timing chart showing the operation of the switching power supply, shown in FIG. 4, in the abrupt load change state.

FIG. 5 is a timing chart showing the operation of the switching power supply in the abrupt load change state according to this embodiment.

FIG. 5 shows the assumed operation of the switching power supply when output current Io has dropped abruptly between time t10 and time t12. This phenomenon occurs when a load, CPU or DSP, connected to output terminals 3 and 4 has switched from active to inactive state.

Before time t10, the amount of output current Io is small and its change is negligible. Therefore, output voltage Vo maintains a target voltage. In this case, output control signal S6 of filter 51 is at a lower level than output control signal S3 of filter 41. Therefore, output control signal S7 of comparator 52 remains high. From the inverted input terminal (−) of amplifier 30 point of view, this keeps transistor 53 off so that control signal S8 is at a high impedance state. Therefore, before time t10, abrupt load change detector circuit 50 has no substantial influence on the operation of control circuit 6.

Next, when output current Io starts to drop abruptly at time t10, output voltage Vo starts to rise abruptly. When output voltage Vo starts to rise abruptly, filter 41, which receives the voltage, elevates the level of control signal S3 as its output while filter 51 elevates the level of control signal S6 as its output. In this case, in response to a change in output voltage Vo, setting is made so that output control signal S6 of filter 51 varies to a greater extent than output control signal S3 of filter 41. Therefore, the level of control signal S3 compared with that of control signal S6 is reversed at time t11; that is, control signal S6 is at a higher level than control signal S3.

This drives output control signal S7 of comparator 52 Low and turns on transistor 53. When transistor 53 is turned on, the level of control signal S8 becomes the voltage of output terminal 3 (Vo). This voltage is supplied to the inverted input terminal (−) of amplifier 30 via resistor 54.

This abruptly drops the level of output control signal S1 of amplifier 30, typically to a minimum level. Thus, PWM control circuit 31 which receives control signal S1 substantially decreases the pulse widths of control signal a, b to a minimum value thereby causing the high level of output voltage Vo to abruptly drop towards the target voltage. Such a state is maintained until the level of control signal S3 compared with that of control signal S6 is reversed. In other words, the level of control signal S6 becomes lower than that of control signal S3.

When control signal S6 is at a lower level than control signal S3 at time t13, output control signal S7 of comparator 52 returns to high level, turning off transistor 53 again. Thus, abrupt load change detector circuit 50 has no substantial influence on the operation of control circuit 6. Then, the level of output voltage Vo is recovered to the target voltage at time t14, which stabilizes the level of control signal S1.

With the foregoing operation, for the switching power supply according to this embodiment, it is possible to promptly recover from an abrupt rise in output voltage Vo caused by an abrupt change in the load state, which dramatically improves transient response.

In FIG. 5, the waveform of output voltage Vo and control signal S1 obtained when abrupt load change detector circuit 50 is removed from the switching power supply according to this embodiment are shown as Vo' and S1'. As understood from FIG. 5, when abrupt load change detector circuit 50 is removed from the switching power supply according to this embodiment, the drop in control signal S1 is smooth even when output voltage Vo has risen abruptly due to an abrupt change in the load. This results in a longer time to restore the level of output voltage Vo to the target voltage. In this example, when the level of output voltage Vo is recovered to the target voltage at time t15, the level of control signal S1 is stabilized.

In switching power supply according to this embodiment, when output voltage Vo has risen abruptly due to an abrupt change in the load state, it is possible to recover the level of output voltage Vo faster by the time given by time t15 minus time t14 than when abrupt load change detector circuit 50 is omitted.

Operation of the switching power supply according to this embodiment in normal state will be described.

Figure 6:
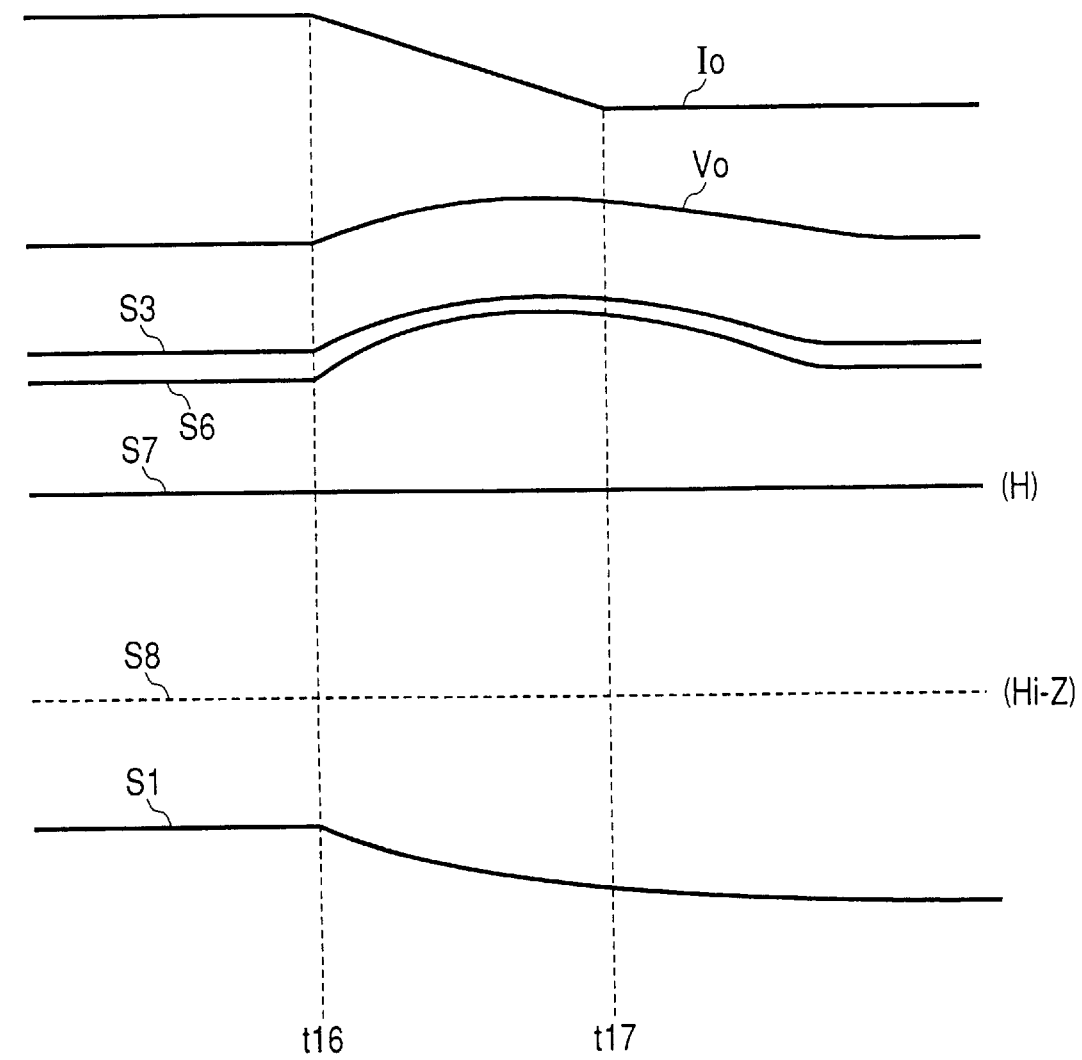
FIG. 6 is a timing chart showing the operation of the switching power supply, shown in FIG. 4, in normal state.

FIG. 6 is a timing chart showing the operation of the switching power supply according to this embodiment in normal state. FIG. 6 shows the assumed operation of switching power supply when the amount of output current Io has decreased relatively smoothly between time t16 and time t17 (time t17−time t16<time t12−time t10).

When the amount of output current Io decreases relatively smoothly as shown in FIG. 3, the corresponding rise in output voltage Vo is also smooth and the level of control signal S3 and compared with that of control signal S6 is not reversed. Thus, output control signal S7 of comparator 52 remains High while transistor 53 remains off. As stated earlier, when transistor 53 is off, abrupt load change detector circuit 50 has no substantial influence on the operation of control circuit 6. Thus, the switching power supply according to this embodiment is capable of performing normal operation in normal state.

As said above, in switching power supply according to this embodiment, it is possible to promptly recover from an abrupt rise in output voltage Vo caused by an abrupt change in the load state. Thus it is possible to effectively prevent malfunction of a load caused by a change in the supply voltage even when a CPU or DSP is the load.

Third Embodiment

Next, another preferred embodiment of the invention will be described.

Figure 7:
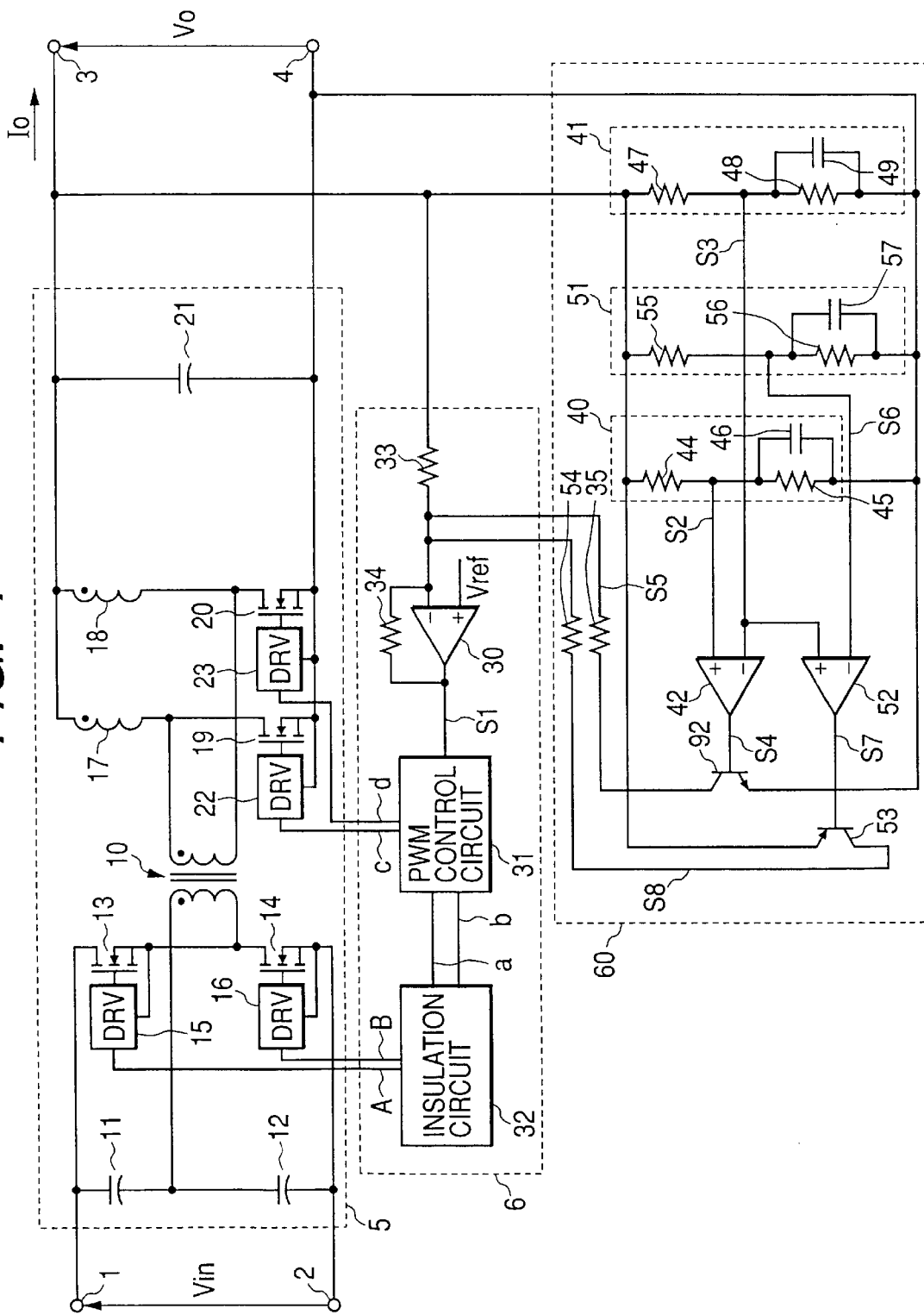
FIG. 7 is a circuit diagram of the switching power supply according to the third embodiment of the invention.

FIG. 7 is a circuit diagram of the switching power supply according to third embodiment of the invention.

As shown in FIG. 7, the switching power supply according to this embodiment differs from the switching power supply shown in FIG. 1 in that abrupt load change detector circuit 7 is replaced with abrupt load change detector circuit 60. Other configuration is the same as the switching power supply shown in FIG. 1 so any corresponding description shall be omitted.

Abrupt load change detector circuit 60 comprises filter 40, filter 41, filter 51, comparator 42, comparator 52, transistor 43, transistor 53, and resistors 35 and 54.

Circuit configuration of filters 40, 41 and 51 is as said earlier in the first and second embodiments. Filters 40, 41 and 51 generate control signals S3, S2 and S6 respectively. As said earlier, comparators 42 and 51 receive the corresponding control signals and generate control signals S4 and S7 respectively based on the received control signals. Control signal S4 is supplied to the base of transistor 43 as said earlier. Its collector is connected to the inverted input terminal (−) of amplifier 30 via resistor 35. Similarly, control signal S7 is supplied to the base of transistor 53 and its collector is connected to the inverted input terminal (−) of amplifier 30 via resistor 54.

As said earlier, setting is made so that filter 40 will have a larger time constant than filter 41 and that filter 41 will have a larger time constant than filter 51. Therefore, when output voltage Vo has varied, filter 41 is subject to a larger change than filter 40 and filter 51 is subject to a larger change than filter 41. Further, setting is made so that when output voltage Vo is stable or when output voltage Vo is subject to a small change, output control signal S2 of filter 40 will be at a lower level than output control signal S3 of filter 41 and output control signal S6 of filter 51 will be at a lower level than output control signal S3 of filter 41.

According to the switching power supply comprising abrupt load change detector circuit 60, it is possible to obtain both the action of the switching power supply shown in FIG. 1 and the switching power supply shown in FIG. 4. That is, when output voltage Vo has dropped abruptly due to an abrupt load change, output control signal S2 of comparator 42 is activated (goes High), thus allowing the level of control signal S1 to rise promptly. When output voltage Vo has abruptly risen due to an abrupt load change, output control signal S7 of comparator 52 is activated (goes Low), thus allowing the level of control signal S1 to drop promptly. In normal state, abrupt load change detector circuit 60 has no substantial influence on the operation of control circuit 6.

Thus, in switching power supply according to this embodiment, it is possible to recover from an abrupt drop or rise in output voltage Vo caused by an abrupt load change. For example, when a CPU or DSP is the load and a change in the supply voltage, occurring from the CPU or DSP, has switching from active to inactive state or vice-versa, it may result in malfunction of the load. But now, it is possible to effectively avoid the malfunction.

Fourth Embodiment

Next, another preferred embodiment of the invention will be described.

Figure 8:
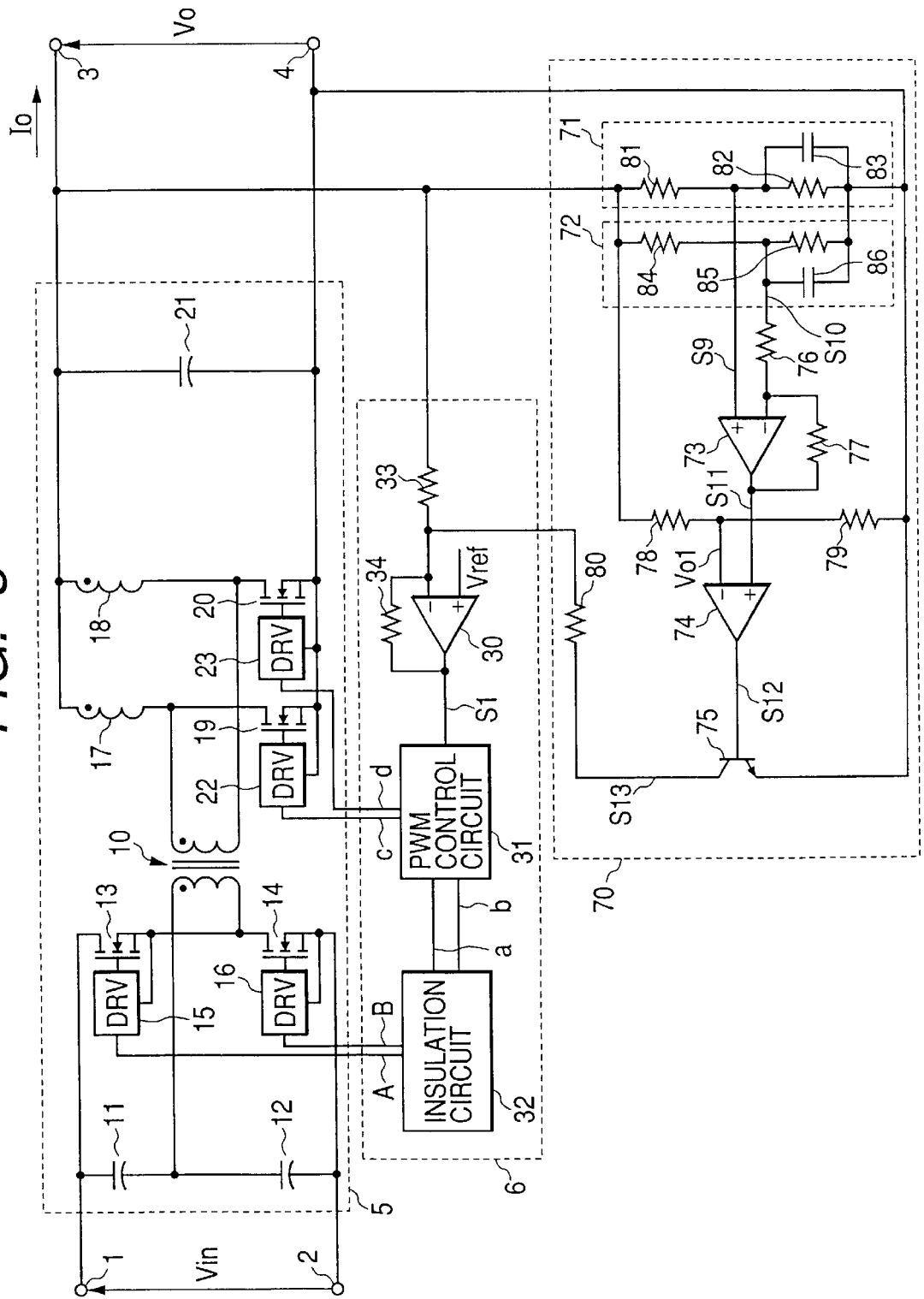
FIG. 8 is a circuit diagram of the switching power supply according to the fourth preferred embodiment of the invention.

FIG. 8 is a circuit diagram of the switching power supply according to the fourth embodiment of the invention.

As shown in FIG. 8, the switching power supply according to this embodiment differs from the switching power supply shown in FIG. 1 in that abrupt load change detector circuit 7 is replaced with abrupt load change detector circuit 70. Other configuration is the same as the switching power supply shown in FIG. 1 so any corresponding description shall be omitted.

Abrupt load change detector circuit 70 comprises filter 71, filter 72, operational amplifier 73, comparator 74, transistor 75, and resistors 76 through 80.

Filter 71 comprises resistors 81 and 82 serially connected between output terminals 3 and 4 and capacitor 83 connected in parallel with resistor 82. The voltage of the connecting point of resistor 81 and 82 is used as control signal S9. Filter 72 comprises resistors 84 and 85 serially connected between output terminals 3 and 4 and capacitor 86 connected in parallel with resistor 85. The voltage of the connecting point of resistor 84 and resistor 85 is used as control signal S10. With this configuration, filter 71 works as a low-pass filter circuit receiving output voltage Vo as an input and exerting control signal S9 while filter 72 works as a low-pass filter circuit receiving output voltage Vo as an input and exerting control signal S10.

The filter characteristics of filter 71 and filter 72 differ from each other. More specifically, setting is made so that filter 71 will have a larger time constant than filter 72. Therefore, when output voltage Vo has varied, filter 72 is subject to a larger change than filter 71. Setting is made so that when output voltage Vo is stable, output control signal S9 of filter 71 will be substantially at the same level as output control signal S10 of filter 72. Setting of such characteristics is made by properly selecting the constants for resistors 81, 82, 84 and 85 as well as capacitors 83 and 86, all constituting to filters 71 and 72.

Operational amplifier 73 comprises an inverted input terminal (−), a non-inverted input terminal (+) and an output terminal. Between the inverted input terminal (−) and filter 72, resistor 76 is connected. Between the inverted input terminal (−) and the output terminal, resistor 77 is connected. Therefore, operational amplifier 73 works as a non-inverted amplifier whose gain is determined by the ratio of the resistance value of resistor 76 and 77. Control signal s9 is supplied to the non-inverted input terminal (+) of operational amplifier 73. Control signal s10 is supplied to the inverted input terminal (−). As a result, the level of output control signal S11 of operational amplifier 73 becomes higher as the level of control signal S10 becomes lower with respect to the level of control signal S9.

Comparator 74 comprises an inverted input terminal (−), a non-inverted input terminal (+) and an output terminal. Control signal s11 is supplied to the non-inverted input terminal (+). Voltage Vo1 obtained by dividing output voltage Vo by resistors 78 and 79 is supplied to the inverted input terminal (−). As a result, when the level of control signal S11 is lower than the level of voltage Vo1, output control signal S12 of comparator 74 goes Low. When the level of control signal S11 is higher than the level of voltage Vo1, output control signal S12 of comparator 74 goes High. While not shown in FIG. 8, a capacitor in parallel with resistor 79 is preferably added in order to further stabilize voltage Vo1. Control signal S12 is used as an abrupt load change detection signal.

Transistor 75, although not limited thereto, comprises an NPN-type bipolar transistor where control signal s12 is supplied to the base. An emitter of transistor 43 is connected to output terminal 4 (GND). A collector of transistor 75 is connected to the inverted input terminal (−) of amplifier 30 via resistor 80.

Operation of the switching power supply according to this embodiment in the abrupt load change state will be described.

Figure 9:
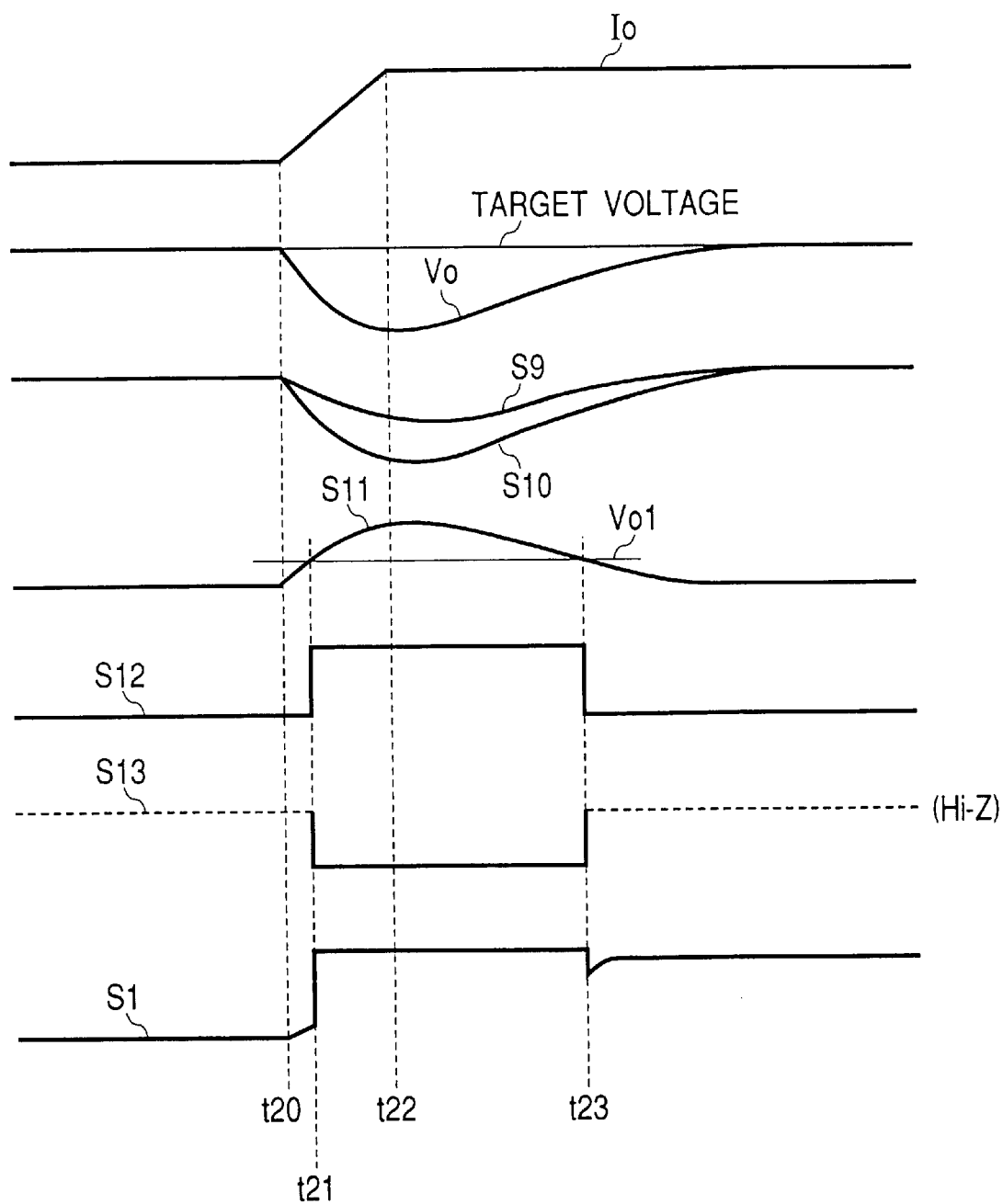
FIG. 9 is a timing chart showing the operation of the switching power supply, shown in FIG. 8, in the abrupt load change state.

FIG. 9 is a timing chart showing the operation of switching power supply according to this embodiment in the abrupt load change state. FIG. 9 shows the operation of the switching power supply assumed when output current Io has raised abruptly between time t20 and time t22.

Before time t20, the amount of output current Io is small and its change is negligible. Therefore, output voltage Vo maintains a target voltage. In this case, output control signal S9 of filter 71 is substantially equal to output control signal S10 of filter 72. Output control signal S11 of operational amplifier 73 is at a predetermined level. The predetermined level is, as shown in FIG. 9, lower than voltage Vo1 obtained by dividing output voltage Vo by resistors 78 and 79. Thus, output control signal S12 of comparator 74 maintains a low level. This keeps transistor 75 off, so that control signal S13 is in the high impedance state at the inverted input terminal (−) of amplifier 30. Thus, before time t20, abrupt load change detector circuit 70 has no substantial influence on the operation of control circuit 6.

Next, when output current Io starts to rise abruptly at time t20, output voltage Vo starts to drop abruptly. When output voltage Vo starts to drop abruptly, filter 71 which receives the voltage decreases the level of output control signal S9 which filter 72 decreases the level of output control signal S10. In this case, in response to a change in output voltage Vo, setting is made so that output control signal S10 of filter 72 varies to a greater extent than output control signal S9 of filter 71. Thus, the level of control signal S11 of operational amplifier 73 rises depending on the difference and exceeds voltage Vo1 at time t21.

This drives control signal S12 of comparator 72 High and turns on transistor 75. When transistor 75 is turned on, the level of control signal S13 becomes the voltage of output terminal 4 (GND) or ground. This supplies a ground to the inverted input terminal (−) of amplifier 30 via resistor 80.

This abruptly elevates the level of output control signal S1 of amplifier 30, typically to a saturation level. Thus, PWM control circuit 31 for receiving control signal S1 substantially increases the pulse widths of control signal a, b to a maximum value thereby causing the low level of output voltage Vo to abruptly rise toward the target voltage. Such a state is maintained until the level of output control signal S11 of operational amplifier 73 drops below voltage Vo1.

As a matter of fact, voltage Vo1 varies in linkage to output voltage Vo. In FIG. 9, the change in output voltage Vo is shown in enlarged view so that a change in voltage Vo1 that accompanies the change in output voltage Vo is omitted.

When the level of control signal S11 drops below voltage Vo1 again at time t23, output control signal S12 of comparator 74 returns to the low level, turning off transistor 43 again. Thus, abrupt load change detector circuit 7 has no substantial influence on the operation of control circuit 6.

With the foregoing operation, for the switching power supply according to this embodiment, it is possible to promptly recover from an abrupt drop in output voltage Vo caused by an abrupt change in the load state which dramatically improves transient response.

Various waveforms obtained when abrupt load change detector circuit 70 is removed from the switching power supply according to this embodiment are not shown in FIG. 9. Similar to the switching power supply according to the aforesaid embodiments, when abrupt load change detector circuit 70 is removed, a rise in control signal S1 is smooth even when output voltage Vo has dropped abruptly due to an abrupt change in the load. This results in a longer time to restore the level of output voltage Vo to the target voltage.

In normal state, a change in output voltage is negligible so that the level of control signal S11 of operational amplifier 73 will not exceed voltage Vo1. Thus, in normal state, output control signal S12 of comparator 74 remains Low while transistor 75 remains off. As stated earlier, when transistor 75 is off, abrupt load change detector circuit 70 has no substantial influence on the operation of control circuit 6. Therefore, the switching power supply according to this embodiment is capable of performing normal operation in normal state.

As said above, in switching power supply according to this embodiment, it is possible to promptly recover from an abrupt drop in output voltage Vo caused by an abrupt change in the load state. Therefore, it is possible to effectively prevent malfunction caused by a change in the supply voltage even when a CPU or DSP is the load.

In switching power supply according to this embodiment, the difference between the level of output control signal S9 of filter 71 and the level of control signal S10 of filter 72 is amplified by using operational amplifier 73 to generate control signal S11, which is compared with voltage Vo1 as the threshold. Thus it is possible to detect amore accurate and stable abrupt load change than the switching power supply shown in FIG. 1.

Further, in switching power supply according to this embodiment, voltage Vo1 as the threshold is generated based on output voltage Vo. This allows voltage Vo1 to automatically track a change in the level of control signal S11 caused by changes in the target value of output voltage Vo by way of VID (Voltage Identification) code, which set the output voltage or by droop control. As a result, it is not necessary to change the control in abrupt load change detector circuit 70 even when the target value of output voltage Vo has been changed.

Fifth Embodiment

Next, another preferred embodiment of the invention will be described.

Figure 10:
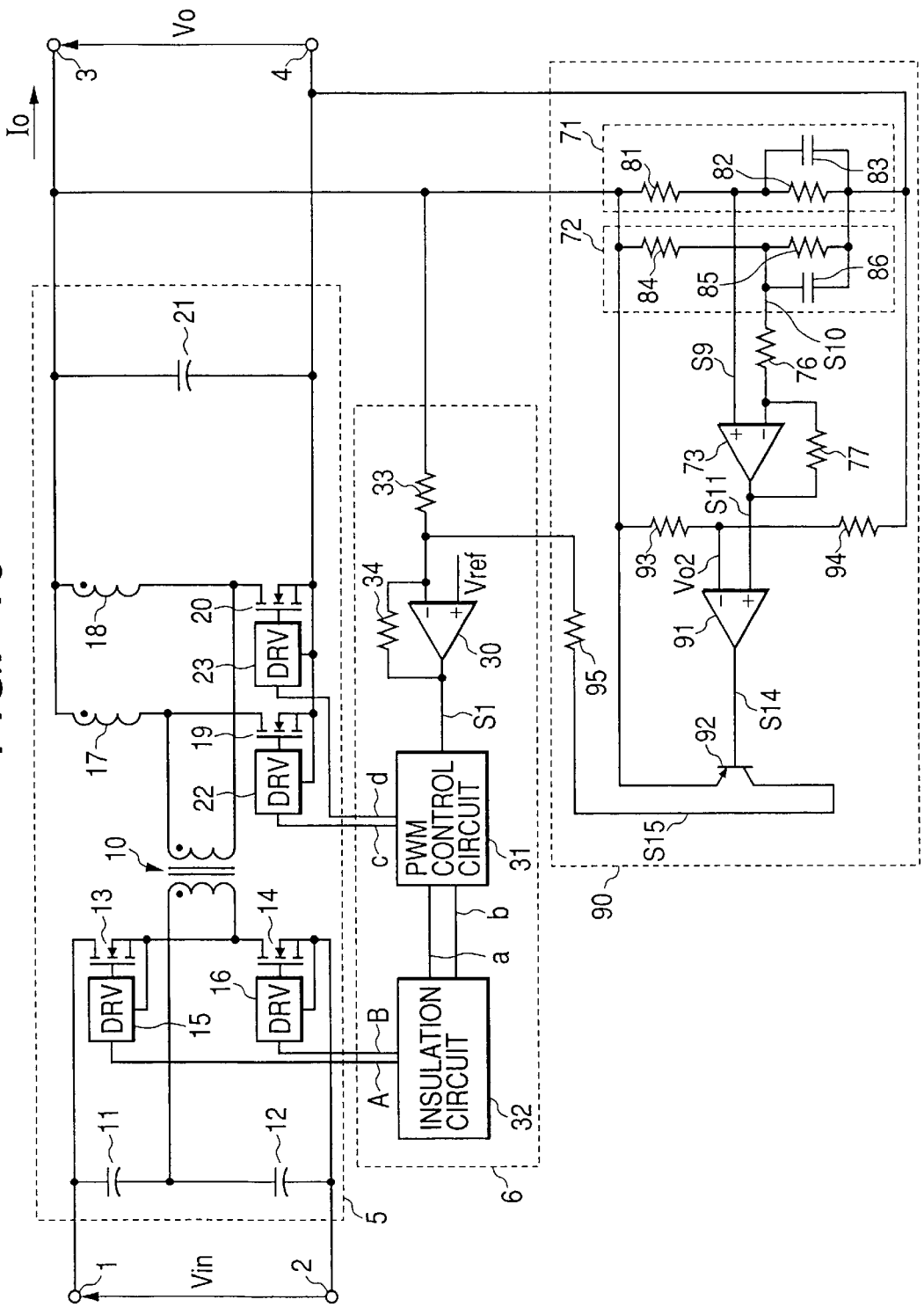
FIG. 10 is a circuit diagram of the switching power supply according to the fifth embodiment of the invention.

FIG. 10 is a circuit diagram of the switching power supply according to the fifth embodiment of the invention.

As shown in FIG. 10, the switching power supply according to this embodiment differs from the switching power supply shown in FIG. 1 in that abrupt load change detector circuit 7 is replaced with abrupt load change detector circuit 90. Other configurations are similar to the switching power supply shown in FIG. 1 so any corresponding description shall be omitted.

Abrupt load change detector circuit 90 has a configuration similar to that of abrupt load change detector circuit 70 shown in FIG. 8 except that comparator 74 is replaced with comparator 91, transistor 75 with transistor 92 and resistors 78 through 80 with resistors 93 through 95. Other configuration is the same as switching power supply 70 shown in FIG. 8 so any corresponding description shall be omitted.

Comparator 91 comprises an inverted input terminal (−), a non-inverted input terminal (+) and an output terminal. Control signal s11 is supplied to the non-inverted input terminal (+). Voltage Vo2 obtained by dividing output voltage Vo by resistors 93 and 94 is supplied to the inverted input terminal (−). As a result, when the level of control signal S11 is higher than the level of voltage Vo2, output control signal S14 of comparator 91 goes High. When the level of control signal S11 is lower than the level of voltage Vo2, output control signal S14 of comparator 91 goes Low. While not shown in FIG. 10, a capacitor in parallel with resistor 94 is preferably added in order to further stabilize voltage Vo2. Control signal S14 is used as an abrupt load change detection signal.

Transistor 92, although not limited thereto, comprises a PNP-type bipolar transistor, where control signal S14 is supplied to the base. An emitter of transistor 92 is connected to output terminal 3 (Vo). A collector of transistor 92 is connected to the inverted input terminal (−) of amplifier 30 via resistor 95.

Next, the operation of the switching power supply according to this embodiment in the abrupt load change state will be described.

Figure 11:
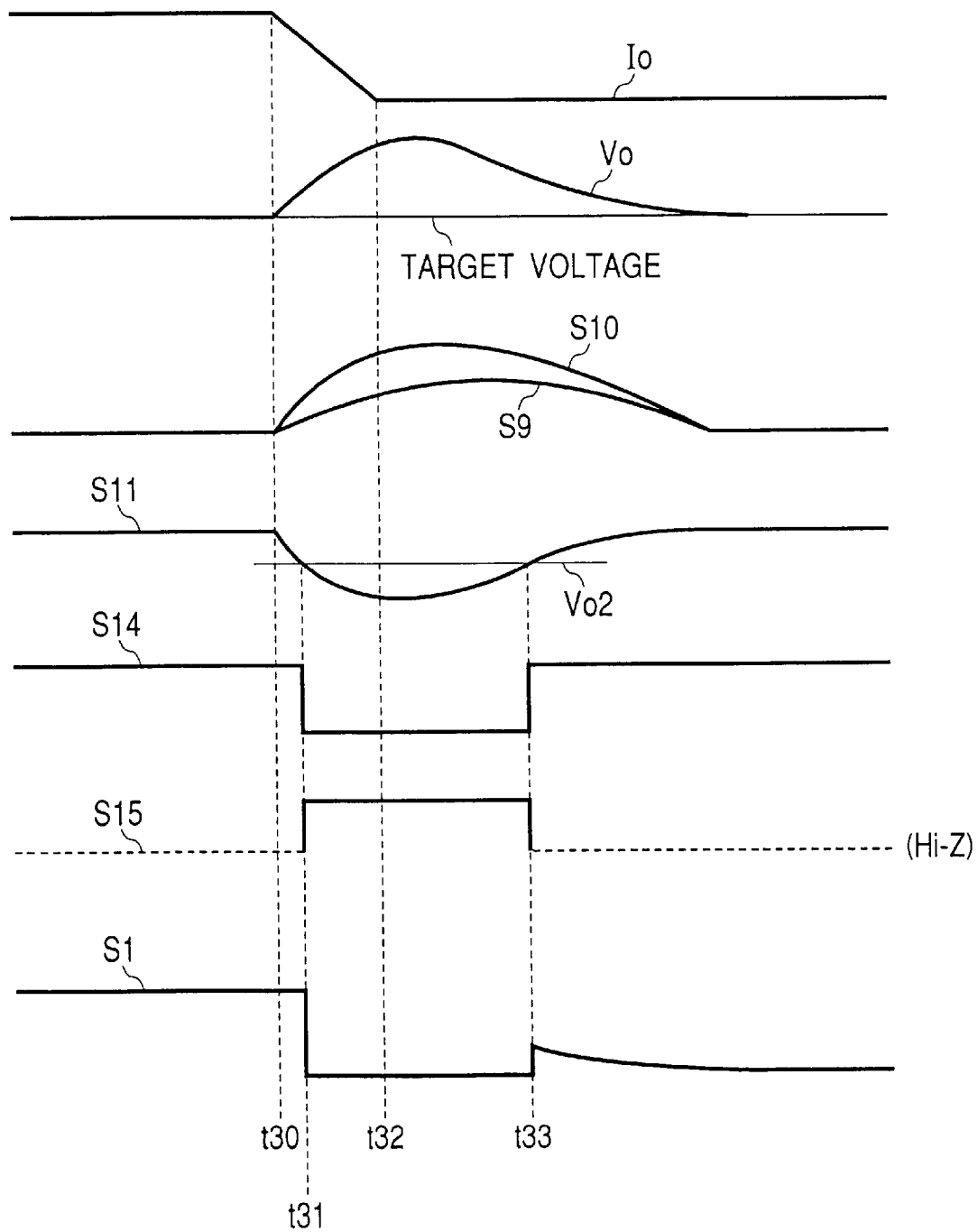
FIG. 11 is a timing chart showing the operation of the switching power supply, shown in FIG. 10, in the abrupt load change state.

FIG. 11 is a timing chart showing the operation of the switching power supply according to this embodiment in the abrupt load change state. FIG. 11 shows the operation of the switching power supply assumed when output current Io has increased abruptly between time t30 and time t32.

Before time t30, the amount of output current Io is large and its change is negligible. Thus, output voltage Vo maintains a target voltage. In this case, the level of output control signal S9 of filter 71 is substantially the same as that of output control signal S10 of filter 72. Thus output control signal S11 of comparator 73 remains at a predetermined level. The predetermined level is, as shown in FIG. 11, higher than voltage Vo2 obtained by dividing output voltage Vo by resistors 93 and 94. Thus, output control signal S14 of comparator 91 maintains a high level. This keeps transistor 92 off, so that control signal S15 is in the high impedance state at the inverted input terminal (−) of amplifier 30. Thus, before time t30, abrupt load change detector circuit 90 has no substantial influence on the operation of control circuit 6.

Next, when output current Io starts to drop abruptly at time t30, output voltage Vo starts to rise abruptly. When output voltage Vo starts to rise abruptly, filter 71 for receiving the voltage elevates the level of control signal S9 as its output while filter 72 elevates the level of control signal S10 as its output. In this case, in response to a change in the output voltage Vo, setting is made so that output control signal S10 of filter 72 varies to a greater extent than output control signal S9 of filter 71. Thus, the level of output control signal S11 of operational amplifier 73 drops depending on the difference between these signals and drops below voltage Vo2 at time t31.

This drives output control signal S14 of comparator 91 Low and turns on transistor 92. When transistor 92 is turned on, the level of control signal S15 becomes the voltage of output terminal 3 (Vo). This voltage is supplied to the inverted input terminal (−) of amplifier 30 via resistor 80.

This abruptly drops the level of output control signal S1 of amplifier 30, typically to a minimum level. Thus, PWM control circuit 31 which receives control signal S1 substantially decreases the pulse widths of control signal a, b to a minimum value thereby causing the high level of output voltage Vo to abruptly drop toward the target voltage. Such a state is maintained until the level of output control signal S11 of operational amplifier 73 exceeds voltage Vo2 again.

When the level of control signal S11 exceeds voltage Vo2 again at time t33, output control signal S14 of comparator 91 returns to the high level, turning off transistor 92 again. Thus, abrupt load change detector circuit 90 has no substantial influence on the operation of control circuit 6.

With the foregoing operation, in the switching power supply according to this embodiment, it is possible to promptly recover from an abrupt rise in output voltage Vo caused by an abrupt change in the load state, which dramatically improves transient response.

Various waveforms obtained when abrupt load change detector circuit 90 is removed from switching power supply according to this embodiment are not shown in FIG. 11. Similar to the switching power supply according to the aforesaid embodiments, when abrupt load change detector circuit 90 is removed, a drop in control signal S1 is smooth even when output voltage Vo has risen abruptly due to an abrupt change in the load state. This results in a longer time to restore the level of output voltage Vo to the target voltage.

In normal state, a change in the output voltage is negligible so that the level of output control signal S11 of operational amplifier 73 will not drop below voltage Vo2. Thus, in normal state, output control signal S14 of comparator 91 remains High while transistor 92 remains off. As stated earlier, when transistor 92 is off, abrupt load change detector circuit 90 has no substantial influence on the operation of control circuit 6. Therefore, the switching power supply according to this embodiment is capable of performing normal operation in normal state.

As said above, in the switching power supply according to this embodiment, it is possible to promptly recover from an abrupt rise in output voltage Vo caused by an abrupt change in the load state. Therefore it is possible to effectively prevent malfunction caused by a change in the supply voltage even when a CPU or DSP is the load.

In switching power supply according to this embodiment, as seen from the power supply in FIG. 8, the difference between the level of output control signal S9 of filter 71 and the level of output control signal S10 of filter 72 is amplified by using operational amplifier 73 to generate control signal S11, which is compared with voltage Vo2 which is a threshold. Thus it is possible to detect a more accurate and stable an abrupt load change than the switching power supply shown in FIG. 1.

Further, in the switching power supply according to this embodiment, as seen from the power supply in FIG. 8, voltage Vo2 which is a threshold is generated based on output voltage Vo. This allows voltage Vo2 to automatically track a change in the level of control signal S11 caused changes in the target value of output voltage Vo byway of VID (Voltage Identification) code which set output voltage or droop control. As a result, it is not necessary to change the control in abrupt load change detector circuit 90 even when the target value of output voltage Vo has been changed.

Sixth Embodiment

Next, another preferred embodiment of the invention will be described.

Figure 12:
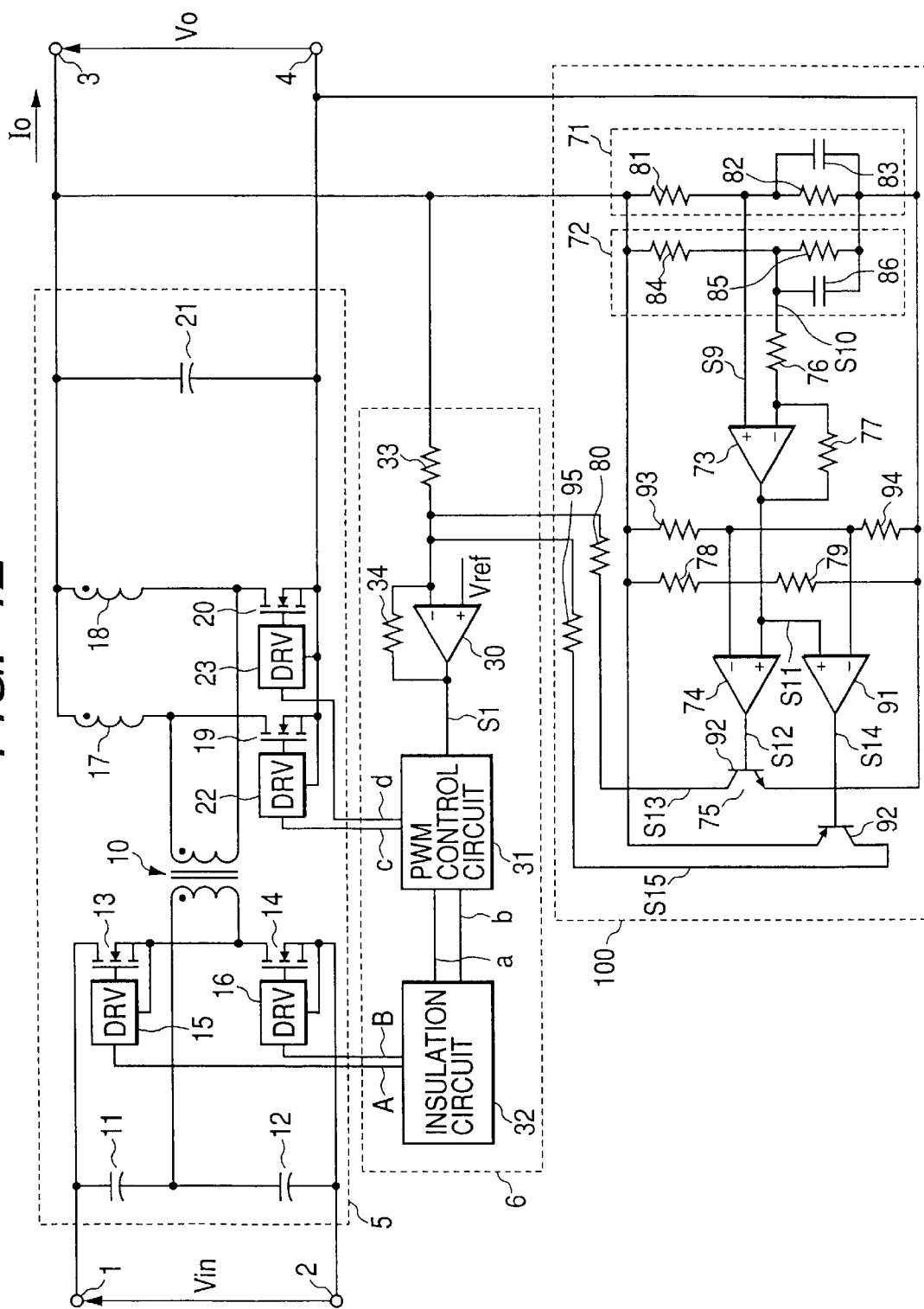
FIG. 12 is a circuit diagram of the switching power supply according to the sixth embodiment of the invention.

FIG. 12 is a circuit diagram of the switching power supply according to the sixth embodiment of the invention.

As shown in FIG. 12, the switching power supply according to this embodiment differs from the switching power supply shown in FIG. 1 in that abrupt load change detector circuit 7 is replaced with abrupt load change detector circuit 100. Other configurations are the same as the switching power supply shown in FIG. 1 so any corresponding description shall be omitted.

Abrupt load change detector circuit 100 comprises filter 71, filter 72, operational amplifier 73, comparator 74, comparator 91, transistor 75, transistor 92, and resistors 76 through 80 and 93 through 95.

Circuit configuration of filters 71 and 72 is as said earlier. Filters 71 and 72 generate control signals S9 and S10 respectively. Operational amplifier 73 receives control signals S9 and S10 to generate control signal S11 obtained by amplifying the difference between the levels. Comparators 74 and 91 also generate control signals S12 and S14 respectively based on control signal S11 and corresponding voltage Vo1 or Vo2, as said earlier. Control signal S12 is supplied to the base of transistor 75 as said earlier. Its collector is connected to the inverted input terminal (−) of amplifier 30 via resistor 80. Similarly, control signal S14 is supplied to the base of transistor 92 and its collector is connected to the inverted input terminal (−) of amplifier 30 via resistor 95.

As said earlier, setting is made so that voltage Vo1 is higher than a level of control signal S11 in the low-level normal state and that voltage Vo2 is lower than a level of control signal S11 in the high-level steady state.

According to the switching power supply which comprises abrupt load change detector circuit 100, it is possible to obtain both the action of the switching power supply shown in FIG. 8 and that of the switching power supply shown in FIG. 10. That is, when output voltage Vo has dropped abruptly due to an abrupt load change, output control signal S12 of comparator 74 is activated (goes High), thus allowing the level of control signal S1 to rise promptly.

When output voltage Vo has abruptly risen due to an abrupt load change, output control signal S14 of comparator 91 is activated (goes Low), thus allowing the level of control signal S1 to drop promptly. In normal state, abrupt load change detector circuit 100 has no substantial influence on the operation of control circuit 6.

Thus, in the switching power supply according to this embodiment, it is possible to recover from an abrupt drop or a rise in output voltage Vo caused by an abrupt load change. For example, when a CPU or DSP is the load and a change in the supply voltage, occurring from the CPU or DSP switching from active state to inactive state or vice-versa, it may result in malfunction of the load. But now, it is possible to effectively avoid the malfunction.

Seventh Embodiment

Next, another preferred embodiment of the invention will be described.

Figure 13:
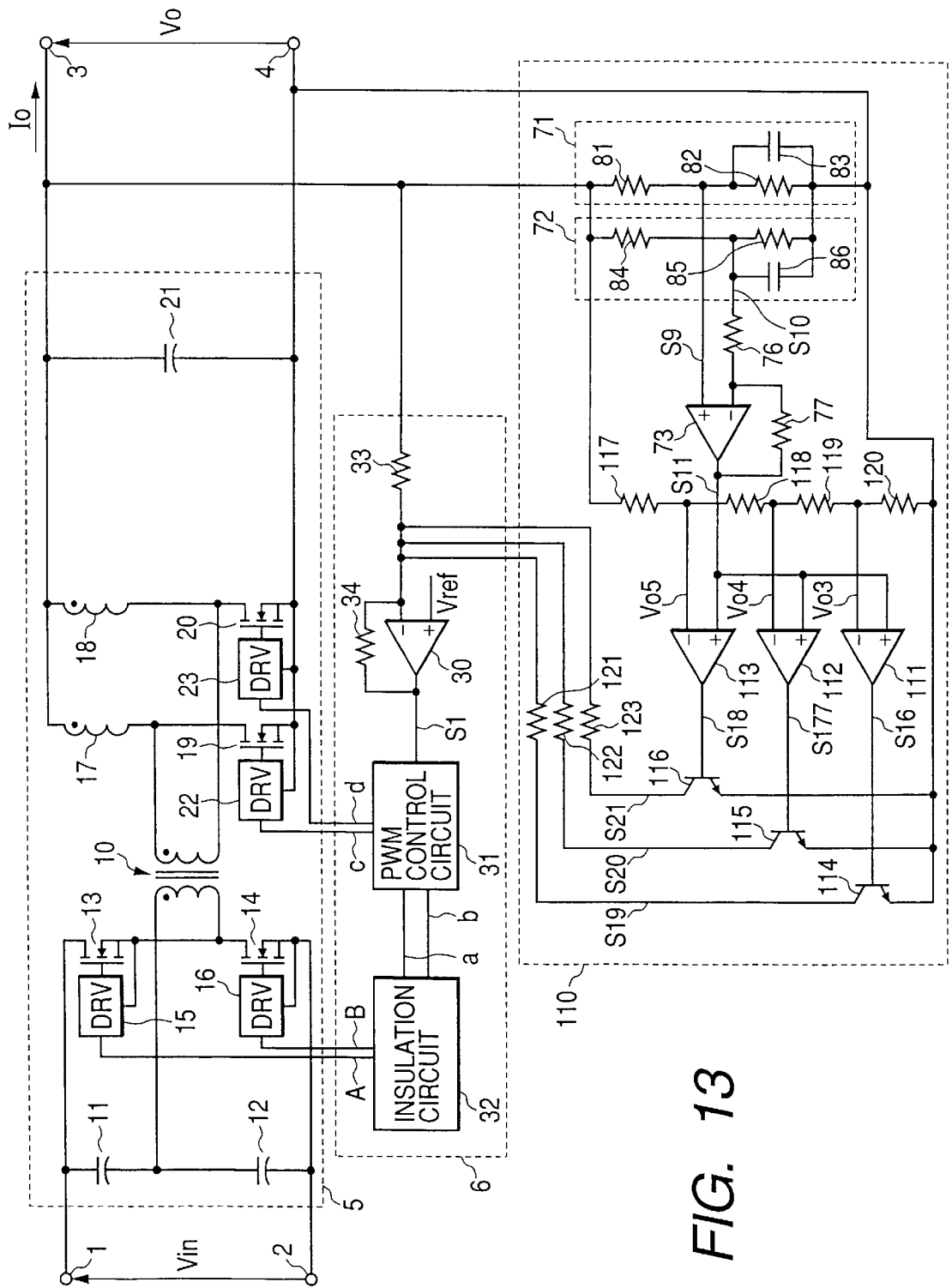
FIG. 13 is a circuit diagram of the switching power supply according to the seventh embodiment of the invention.

FIG. 13 is a circuit diagram of the switching power supply according to seventh embodiment of the invention.

As shown in FIG. 13, the switching power supply according to this embodiment differs from the switching power supply shown in FIG. 1 in that abrupt load change detector circuit 7 is replaced with abrupt load change detector circuit 110. Other configuration is the same as the switching power supply shown in FIG. 1 so any corresponding description shall be omitted.

Abrupt load change detector circuit 110 has a configuration similar to that of abrupt load change detector circuit 70 shown in FIG. 8 except that comparator 74 is replaced with three comparators 111 through 113, transistor 75 with three transistors 114 through 116, and a series element comprising resistor 78 and resistor 79 is replaced with a series element comprising resistors 117 through 120, and resistor 80 with three resistors 121 through 123. Other configuration is the same as switching power supply 70 shown in FIG. 8 so any corresponding description shall be omitted.

Comparator 111 comprises an inverted input terminal (-), a non-inverted input terminal (+) and an output terminal. Control signal s11 is supplied to the non-inverted input terminal (+). Voltage Vo3 obtained by dividing output voltage Vo by resistors 117 through 119 and resistor 120 is supplied to the inverted input terminal (-). As a result, when the level of control signal S11 is higher than the level of voltage Vo3, output control signal S16 of comparator 111 goes High. When the level of control signal S11 is lower than the level of voltage Vo3, output control signal S16 of comparator 111 goes Low.

Comparator 112 comprises an inverted input terminal (-), a non-inverted input terminal (+) and an output terminal. Control signal S11 is supplied to the non-inverted input terminal (+). Voltage Vo4 obtained by dividing output voltage Vo by resistors 117 and 118 and resistors 119 and 120 is supplied to the inverted input terminal (-). As a result, when the level of control signal S11 is higher than the level of voltage Vo4, output control signal S17 of comparator 112 goes High. When the level of control signal S11 is lower than the level of voltage Vo4, output control signal S17 of comparator 112 goes Low.

Comparator 113 comprises an inverted input terminal (-), a non-inverted input terminal (+) and an output terminal. Control signal S11 is supplied to the non-inverted input terminal (+). Voltage Vo5 obtained by dividing output voltage Vo with resistor 117 and resistors 118 through 120 is supplied to the inverted input terminal (-). As a result, when the level of control signal S11 is higher than the level of voltage Vo5, output control signal S18 of comparator 113 goes High. When the level of control signal S11 is lower than the level of voltage Vo5, output control signal S18 of comparator 113 goes Low.

Transistor 114, although not limited thereto, comprises an NPN-type bipolar transistor, where control signal S16 is supplied to the base. An emitter of transistor 114 is connected to output terminal 4 (GND). A collector of transistor 114 is connected to the inverted input terminal (-) of amplifier 30 via resistor 121.

Transistor 115, although not limited thereto, comprises an NPN-type bipolar transistor, where control signal S17 is supplied to the base. An emitter of transistor 115 is connected to output terminal 4 (GND). A collector of transistor 115 is connected to the inverted input terminal (-) of amplifier 30 via resistor 122.

Transistor 116, although not limited thereto, comprises an NPN-type bipolar transistor, where control signal s18 is supplied to the base. An emitter of transistor 116 is connected to output terminal 4 (GND). A collector of transistor 116 is connected to the inverted input terminal (-) of amplifier 30 via resistor 123.

The resistance values of resistors 121 through 123 are preferably set so that the combined resistance of these resistors connected in parallel will be approximately the same as resistors 35, 54, 80 and 95 used in the foregoing embodiments.

While not shown in FIG. 13, a capacitor in parallel with resistor 120 is preferably added in order to further stabilize voltages Vo3 through Vo5.

For abrupt load change detector circuit 110 having such a configuration, voltages Vo3, Vo4 and Vo5 are represented by Vo3<Vo4<Vo5. When output voltage Vo has dropped due to an abrupt load change, it is possible to vary in stages the resistance value between the inverted input terminal (-) and output terminal 4 (GND) of amplifier 30 depending on the degree of voltage drop.

More specifically, when the level of output control signal S11 of operational amplifier 73 is instate S11<Vo3 (steady state), all transistors 114 through 116 are off so that control signals S19 through S21 are in the high impedance state at the inverted input terminal (-) of amplifier 30. Thus, in this case, abrupt load change detector circuit 110 has no substantial influence on the operation of control circuit 6.

When the level of control signal S11 of operational amplifier 73 is in state Vo3<S11<Vo4, transistor 114 turns on while transistors 115 and 116 turns off so that ground is supplied to the inverted input terminal (-) of amplifier 30 via resistor 121. Therefore, control signal S1 rises up to voltage level (V1) determined by the resistance value of resistor 121.

When the level of control signal S11 of operational amplifier 73 is in state Vo4<S11<Vo5, transistors 114 and 115 turns on while transistor 116 turns off so that ground is supplied to the inverted input terminal (-) of amplifier 30 via parallel resistors 121 and 122. Therefore, control signal S1 rise up to voltage level (V2 (>V1)) determined by the total resistance value of parallel resistors 121 and 122 (total resistance value 1). In this case, total resistance value 1 is lower than the resistance value of resistor 121. Thus the rise in control signal S1 is more prompt than when the level of the control signal S1 is represented by Vo3<S11<Vo4.

When the level of control signal S11 of operational amplifier 73 is in state S11>Vo5, all transistors 114 through 116 are turned on so that ground is supplied to the inverted input terminal (-) of amplifier 30 via parallel resistors 121 through 123. Therefore, control signal S1 rises up to voltage level (V3 (>V2)) determined by the total resistance value of parallel resistors 121 through 123 (the second total resistance value). In this case, the second total resistance value is lower than the first total resistance value. Therefore, the rise in control signal S1 is more prompt than when the level of control signal SI is represented by Vo4<S11<Vo5.

In this way, in the switching power supply according to this embodiment, when output voltage Vo has dropped due to an abrupt load change, it is possible to elevate the level of control signal S1 up to the voltage level dependent on the degree of voltage drop of output voltage Vo. Thus, the switching power supply according to this embodiment is capable of recovering more accurately, output voltage Vo that has dropped abruptly due to an abrupt load change than the switching power supply shown in FIG. 8.

For switching power supply according to this embodiment, while three comparators 111 through 113 are used to control three stages of the restoration speed of output voltage Vo that has dropped abruptly due to abrupt load change, the number of comparators is an example and two or more than four comparators may be used.

While not shown, in the same way comparator 74 included in abrupt load change detector circuit 70 shown in FIG. 8 is replaced by several comparators 111 through 113 having difference thresholds in abrupt load change detector circuit 110 shown in FIG. 13, comparator 91 included in abrupt load change detector circuit 90 shown in FIG. 10 may also be replaced with several comparators having different thresholds from each other. When such an abrupt load change detector circuit is used, when output voltage Vo has risen due to an abrupt load change, it is possible to drop the level of control signal S1 to the voltage level which is dependent on the degree of rise in output voltage Vo. Thus it is possible to recover more accurately output voltage Vo that has abruptly risen due to an abrupt load change than the switching power supply shown in FIG. 10.

While not shown, similar to comparator 74 included in abrupt load change detector circuit 100 shown in FIG. 12 is replaced with several comparators having different thresholds from each other, comparator 91 may also be replaced with several comparators having different thresholds. When such an abrupt load change detector circuit is used and when output voltage Vo has dropped due to an abrupt load change, it is possible to elevate the level of control signal S1 to the voltage level that is dependent on the degree of drop in output voltage Vo, and it is also possible to drop the level of control signal S1 to the voltage level dependent on the degree of rise in output voltage Vo when output voltage Vo has risen due to an abrupt load change. Therefore, it is possible to recover output voltage Vo that has abruptly dropped or risen due to an abrupt load change more accurately than the switching power supply shown in FIG. 12. Note that the number of comparators to replace comparator 74 does not need to be equal to the number of comparators to replace comparator 91; these numbers may be different from each other.

In switching power supply according to the aforesaid embodiments, when abrupt load change state is detected by an abrupt load change detector circuit, output voltage Vo is promptly recovered by controlling the level of the inverted input terminal (−) of amplifier 30 included in control circuit 6. Inventive means for promptly recovering output voltage Vo are not limited to this approach but other means may be used for promptly recovering output voltage Vo.

Figure 14:
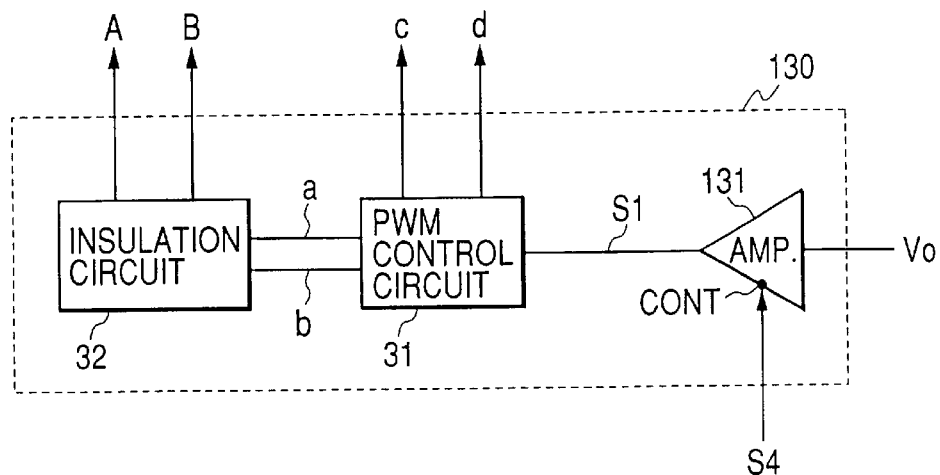
FIG. 14 is a circuit diagram of another control circuit 130 applicable to the switching power supply according to the invention.

FIG. 14 is a circuit diagram of another control circuit 130 applicable to the switching power supply according to the invention.

As shown in FIG. 14, control circuit 130 comprises variable amplifier 131, PWM control circuit 31, and isolation circuit 32.

Variable amplifier 131 comprises an input terminal, an output terminal and a control terminal (CONT). Output voltage Vo is given to the input terminal. Control signal S4 from abrupt load change detector circuit 7 shown in FIG. 1 is given to the control terminal. The output from the output terminal of variable amplifier 131 is used as control signal S1. Variable amplifier 131 has its gain changed depending on the level of control signal S4 given to the control terminal (CONT). In particular, when control signal S4 given to the control terminal (CONT) is Low, the gain of variable amplifier 131 is a first gain (normal gain). When control signal S4 given to the control terminal (CONT) is High, the gain of variable amplifier 131 is a second gain that is higher than the first gain.

As said earlier, control signal S4 is activated (goes High) when output voltage Vo has dropped abruptly. In normal state, the gain of the variable amplifier is a first gain while in the abrupt load change state, the gain of the variable amplifier is a second gain. Thus, when output voltage Vo has dropped abruptly due to an abrupt load change, output control signal S1 of variable amplifier 131 rises promptly thereby recovering from an abrupt drop in output voltage Vo caused by an abrupt load change which is similar to the switching power supply shown in FIG. 1.

The second gain of variable amplifier 131 may be high enough for the transfer function of the closed loop comprising main circuit 5 and control circuit 130 to exceed the limit value where output voltage Vo starts to oscillate. When variable amplifier 131 operates with such a high gain, output voltage Vo will eventually oscillate. However, control signal S4 is activated only for a trace of the duration in the abrupt load change state so that in practice, output voltage Vo will not oscillate in practice.

A signal to be supplied to the control terminal (CONT) of variable amplifier 131 may be control signal S7, S12 or S14 as well as control signal S4.

As seen in abrupt load change detector circuit 110 shown in FIG. 13, when control signals S16 through S18 is generated in stages depending on the degree of change in output voltage Vo, it is preferable to apply to variable amplifier 131, a variable amplifier capable of varying the gain in stages (four stages when control signals S16 through S18 are used) depending on the control signals generated in stages.

Another means for promptly recovering output voltage Vo will be described.

Figure 15:
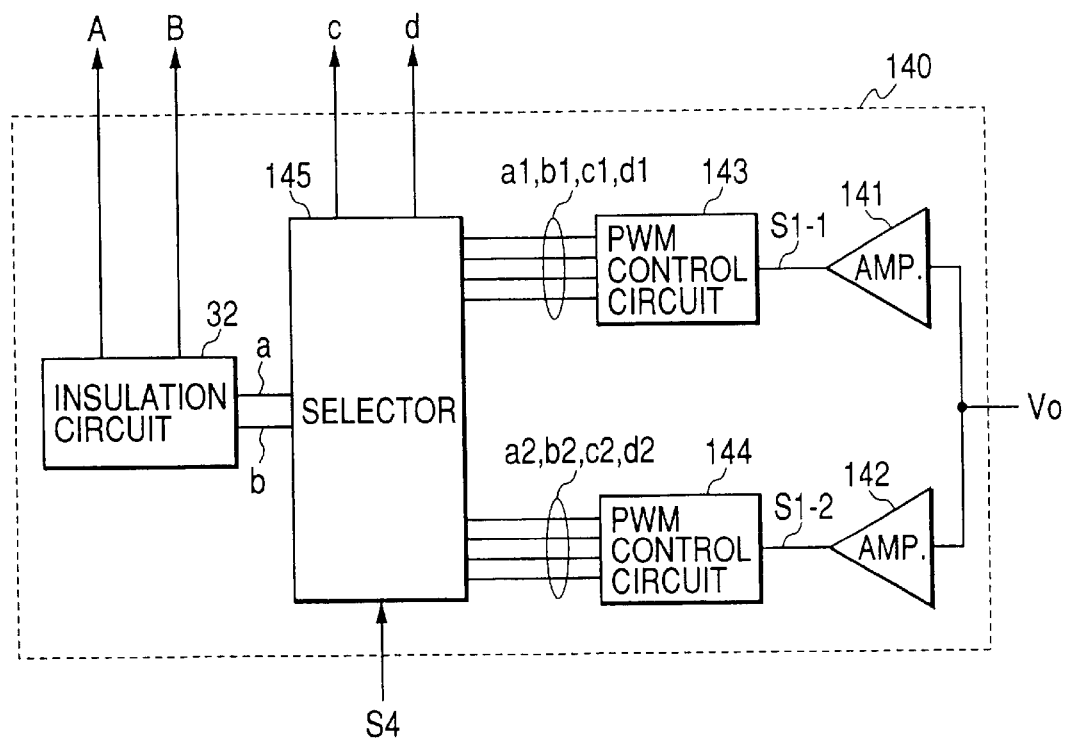
FIG. 15 is a circuit diagram of another control circuit 140 applicable to the switching power supply according to the invention.

FIG. 15 is a circuit diagram of another control circuit 140 applicable to the switching power supply according to the invention.

As shown in FIG. 15, control circuit 140 comprises first amplifier 141, second amplifier 142, first PWM control circuit 143, second PWM control circuit 144, selector 145, and isolation circuit 32.

In control circuit 140, the gain of first amplifier 141 and second amplifier 142 differ from each other. In particular, the gain of second amplifier 142 is set higher than the gain of first amplifier 141. First PWM control circuit 143 receives output control signal S1-1 of first amplifier 141 and controls the pulse widths of control signals a1, b1, c1, and d1. Second PWM control circuit 144 receives output control signal S1-2 of second amplifier 142 and controls the pulse widths of control signals a2, b2, c2, and d2. All control signals a1, b1, c1, d1, a2, b2, c2, and d2 are supplied to selector 145. Selector 145 comprises a selection terminal (SELECT).

Selector 145 selects and exerts control signals a1, b1, c1, and d1 when control signal S4 given to the selection terminal (SELECT) is Low. Selector 145 selects and exerts control signals a2, b2, c2, and d2 when control signal S4 given to the selection terminal (SELECT) is High.

As said earlier, control signal S4 is activated (goes High) when output voltage Vo has dropped abruptly due to an abrupt load change. In normal state, control signals a1, b1, c1, and d1 are selected by selector 145 while in the abrupt load change state, control signals a2, b2, c2, and d2 are selected by selector 145. It is possible to promptly recover from an abrupt drop in output voltage Vo caused by an abrupt load change, similar to the switching power supply shown in FIG. 1, when output voltage Vo has dropped abruptly due to an abrupt load change.

The gain of second amplifier 142 may be set where the transfer function of the closed loop comprising main circuit 5 and control circuit 140 exceeds the limit value where output voltage Vo starts to oscillate. When variable amplifier 131 operates with such a high gain, output voltage Vo will eventually oscillate. A signal to be supplied to the selection terminal (SELECT) of selector 145 may be control signal S7, S12 or S14, as well as control signal S4.

When control signals S16 through S18 generated in stages depending on the degree of change in output voltage Vo are used, such as abrupt load change detector circuit 110 shown in FIG. 13, it is preferable to provide at least three sets of amplifiers and PWM control circuits (four sets in case control signals S16 through S18 are used) depending on the control signals generated in the stages.

Another means for promptly recovering output voltage Vo will be described.

Figure 16:
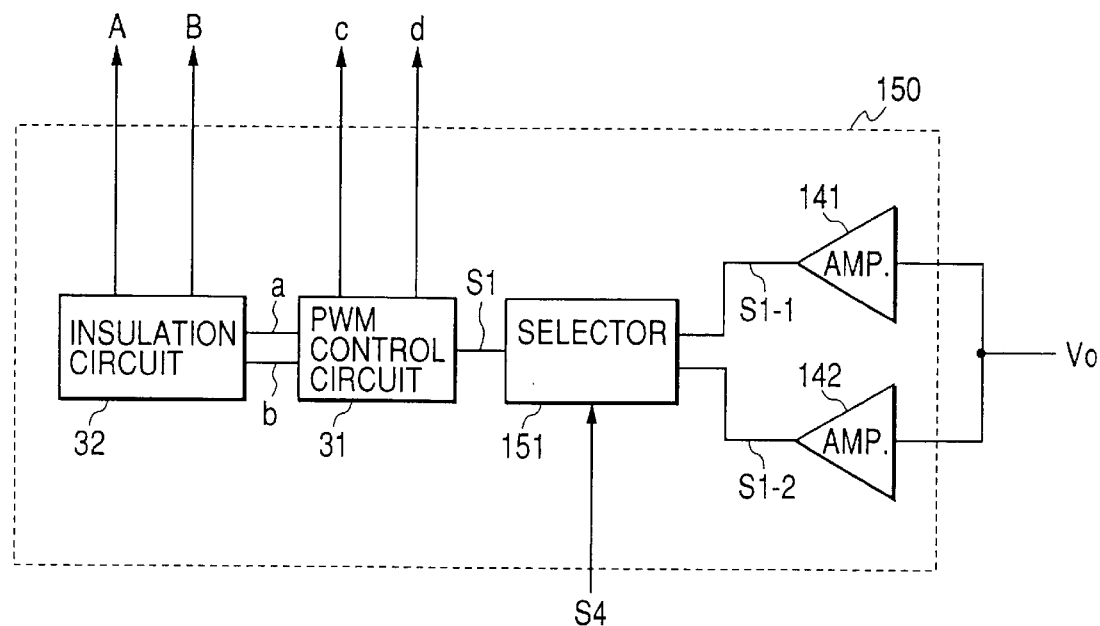
FIG. 16 is a circuit diagram of another control circuit 150 applicable to the switching power supply according to the invention.

FIG. 16 is a circuit diagram of another control circuit 150 applicable to the switching power supply according to the invention.

As shown in FIG. 16, control circuit 150 comprises first amplifier 141, second amplifier 142, selector 151, PWM control circuit 31, and isolation circuit 32.

Selector 151 comprises a selection terminal (SELECT). Selector 151 selects and supplies to PWM control circuit 31 output control signal S-1 of first amplifier 141 when control signal S4 given to the selection terminal (SELECT) is Low. Selector 151 selects and supplies to PWM control circuit 31 output control signal S-1 of second amplifier 142 when control signal S4 given to the selection terminal (SELECT) is High.

Control circuit 150 thus performs approximately the same operation as control circuit 140 which was said earlier.

Another means for promptly recovering output voltage Vo will be described.

Figure 17:
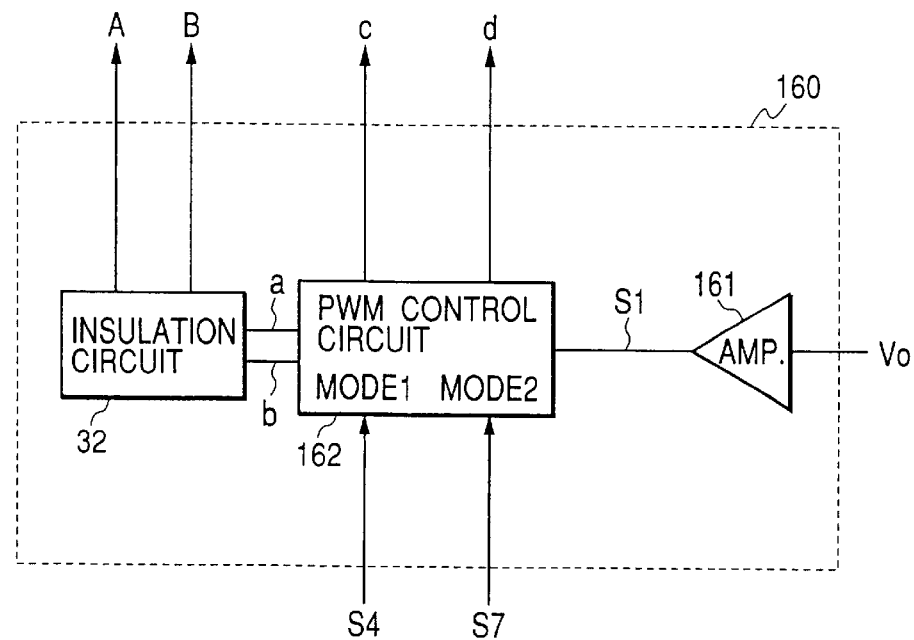
FIG. 17 is a circuit diagram of another control circuit 160 applicable to the switching power supply according to the invention.

FIG. 17 is a circuit diagram of another control circuit 160 applicable to the switching power supply according to the invention.

As shown in FIG. 17, control circuit 160 comprises amplifier 161, PWM control circuit 162, and isolation circuit 32.

PWM control circuit 162 receives control signal S1 supplied from amplifier 161 and controls the pulse widths of control signals a, b, c, d accordingly. Unlike PWM control circuit 31 said earlier, PWM control circuit 162 comprises a first control terminal (MODEL) and a second control terminal (MODE2). Control signal S4 is provided to the first control terminal (MODE1). Control signal S7 is provided to the second control terminal (MODE2). When the first control terminal (MODE1) is activated, PWM control circuit 162 activates control signals c, and d in synchronization with control signals a and b irrelevant to the level of control signal S1 supplied from amplifier 161, thereby placing the rectifier circuit in main circuit 5 in the synchronous rectification state. When the second control terminal (MODE2) is activated, PWM control circuit 162 deactivates control signals c, d irrelevant to the level of control signal S1 supplied from amplifier 161, thereby halting the synchronous rectification in the rectifier circuit in main circuit 5.

Basically, in the state where neither the first control terminal (MODE1) nor second control terminal (MODE2) is activated (normal state), PWM control circuit 162 places the rectifier circuit in main circuit 5 in the synchronous rectification state or halts the synchronous rectification. When PWM control circuit 162 has placed the rectifier circuit in main circuit 5 in the synchronous rectification state, it is possible to remove a loss that is based on a voltage drop of body diodes (not shown) provided in first rectifier switch 19 and second rectifier switch 20 while a loss is generated that is based on recharging/discharging of the gate capacity of first rectifier switch 19 and second rectifier switch 20. When PWM control circuit 162 has halted the synchronous rectification, it is possible to remove a loss that is based on recharging/discharging of the gate capacity of first rectifier switch 19 and second rectifier switch 20 while a loss is generated that is based on a voltage drop of body diodes (not shown) provided in first rectifier switch 19 and second rectifier switch 20. From this point of view, whether the rectifier circuit in main circuit 5 is to be placed in the synchronous rectification state or operation halt state is determined by the amount of output current Io. When output current Io exceeds a predetermined value, the rectifier circuit in main circuit 5 is placed in the synchronous rectification state. When output current Io is below a predetermined value, the synchronous rectification is halted.

As stated earlier, when the first control terminal (MODE1) is activated, PWM control circuit 162 forces the rectifier circuit in main circuit 5 into the synchronous rectification state. When the second control terminal (MODE2) is activated, PWM control circuit 162 forcibly halts the synchronous rectification by the rectifier circuit in main circuit 5. This control is based on technical findings that a rectifier circuit placed in the synchronous rectification state allows output voltage Vo to rise more promptly and that halting of the synchronous rectification allows output voltage Vo to drop more promptly.

As said earlier, control signal S4 is activated (goes High) when output voltage Vo has dropped abruptly due to an abrupt load change. When control circuit 160 is used, it is possible to promptly recover from an abrupt drop in output voltage Vo by forcing the rectifier circuit on main circuit 5 into the synchronous rectification state when output voltage Vo has dropped abruptly. As stated earlier, control signal S7 is activated (goes High) when output voltage Vo has risen abruptly due to an abrupt load change. When control circuit 160 is used, it is possible to promptly recover from an abrupt rise in output voltage Vo by forcibly halting the synchronous rectification when output voltage Vo has risen abruptly.

A signal to be supplied to the first control terminal (MODE1) of PWM control circuit 162 may be control signal S12 as well as control signal S4. Similarly, a signal to be supplied to the second control terminal (MODE2) of PWM control circuit 162 may be control signal S14 as well as control signal S4.

Figure 18:
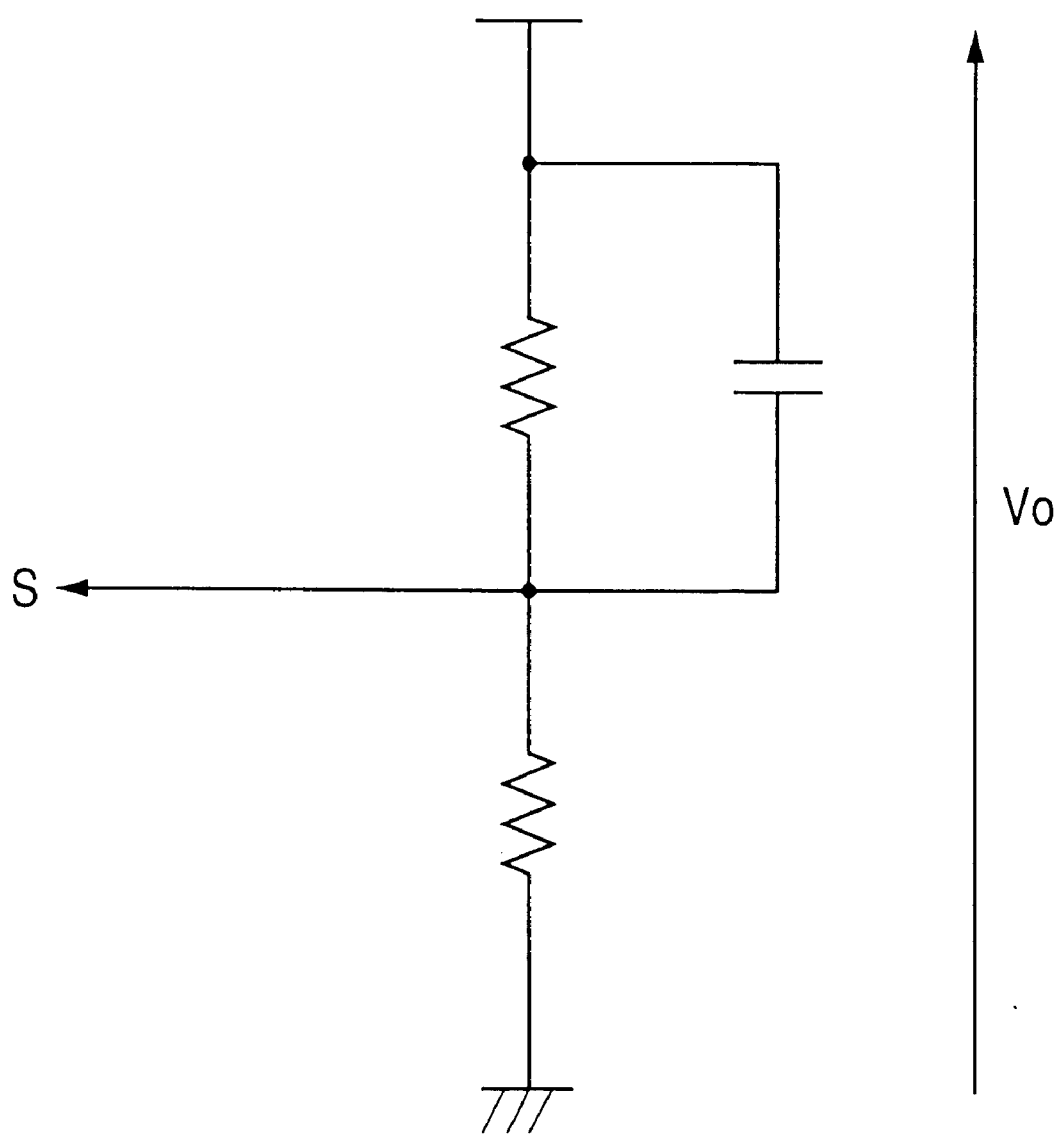
FIG. 18 is a circuit diagram of a high-pass filter.

While a low-pass filter circuit is used as filters included in the abrupt load change detector circuit in the switching power supply according to each embodiment described earlier, it is not mandatory in the invention that the filters included in the abrupt load change detector circuit are low-pass filters, but such filters may be high-pass filters shown in FIG. 18 as long as a proper time constant is set.

While a half-bridge-type switching circuit is used as the primary side circuit of main circuit 5 and a current-doubler-type output circuit is used as the secondary side circuit of main circuit 5 in the switching power supply according to each embodiment described earlier, the primary side circuit and the secondary side circuit of main circuit 5 are not limited to this example but other circuits may be used instead.

For example, as an alternative primary side circuit applicable to the switching power supply according to the invention, a full-bridge-type circuit or a push-pull circuit may be used. Another secondary circuit applicable to switching power supply according to the invention can be a forward-type circuit, a center-tap-type circuit or a bridge-type circuit.

Though main circuit 5 comprises transformer 10, the primary circuit and the secondary circuit in the switching power supply according to each embodiment described earlier, by using several sets each comprising a transformer, a primary circuit and a secondary circuit, the switching power supply can be driven by shifting the phases from each other.

It goes without saying that the invention is not limited to the foregoing embodiments but may be modified in a variety of ways within the scope of the invention as defined in the claims.

While, for the switching power supply shown in FIGS. 8, 10, 12 and 13, as an example, voltages Vo1 through Vo5 obtained by dividing output voltage Vo are used for comparison with the level of output control signal S11 of operational amplifier 73, a predetermined reference voltage may be used instead. Note that, when a predetermined reference voltage is used instead of voltages Vo1 through Vo5 and the target value of output voltage Vo is changed by control circuit 6, it is necessary to change the level of the reference voltage accordingly.

While output voltage Vo is directly supplied to the input terminal of each amplifiers 30, 141, 142, 161 included in control circuits 6, 130, 140, 150 and 160 and variable amplifier 131, a voltage associated with output voltage Vo, for example a voltage obtained by dividing output voltage Vo by using a series element comprising several resistors, may be supplied to each of these input terminals.

As said earlier, according to the invention, it is possible to promptly recover from an abrupt drop and/or rise in output voltage Vo caused by an abrupt load change thereby providing a switching power supply with dramatic improvement in transient response. Thus, according to the switching power supply of the invention, it is possible to effectively prevent malfunction of a load with an abrupt change in the load current such as a CPU or DSP.

According to the switching power supply of the invention, an abrupt load change is indirectly detected by monitoring output voltage Vo, thus eliminating a power loss or operation delay that could take place when output current Io is directly detected using resistors or transformers. Thus it is possible to provide a switching power supply suitable for voltage detection in accordance with a so-called remote sensing means where output capacitor 21 of the switching power supply is arranged in close proximity of the load that is placed relatively apart from the main unit of the switching power supply and output voltage Vo can be detected in close proximity of the load.

What is claimed is:

1. A switching power supply comprising:
   a main circuit having a switching circuit for converting a DC input voltage to an AC voltage and an output circuit for rectifying the AC voltage to generate a DC output voltage;
   a control circuit for controlling the operation of the main circuit; and
   an abrupt load change detector circuit for detecting an abrupt change in the load current supplied from the main circuit, and abrupt load change detector circuit which includes:
   a first filter and a second filter for receiving the output voltage, a time constant of the first filter being different from that of the second filters; and
   detection signal generating means for generating an abrupt load change detection signal based on the outputs of the first and second filters, the detection signal generating means which includes a comparator for receiving an output of the first filter at one input terminal and of the second filter at the other input terminal.

2. The switching power supply according to claim 1, where the first and second filters are either low-pass filters or high-pass filters.

3. The switching power supply according to claim 1, where output voltage levels of the first and second filters in normal state differ from each other.

4. The switching power supply according to claim 1, wherein the detection signal generating means comprises an operational amplifier for amplifying the difference between output voltage levels of the first and second filters and a comparator for activating the abrupt load change detection signal in response to the output of the operational amplifier exceeding a predetermined threshold voltage.

5. The switching power supply according to claim 4, wherein the predetermined threshold voltage is associated with the output voltage.

6. The switching power supply according to claim 4, wherein the output voltage level of the first filter in normal state is substantially equal to that of the second filter.

7. The switching power supply according to any one of claims 1 to 6, wherein the control circuit has an amplifier for receiving the output voltage or a voltage associated with the output voltage at its input terminal and,
   wherein the abrupt load change detector circuit further comprises means for varying the level at the input terminal of the amplifier in response to activation of the abrupt load change detection signal.

8. The switching power supply according to any one of claims 1 to 6, wherein the control circuit has a variable amplifier for receiving the output voltage or a voltage associated with the output voltage at its input terminal, a characteristics of the variable amplifier switched based on the abrupt load change detection signal.

9. The switching power supply according to any one of claims 1 to 6, wherein the control circuit comprises: several amplifiers having different characteristics for receiving the output voltage or a voltage associated with the output voltage at the respective input terminal, several PWM control circuits for generating corresponding control signal groups based on the outputs of the corresponding amplifiers, and a selector for selecting one of the control signal groups based on the abrupt load change detection signal, thereby controlling the operation of the main circuit based on the selected control signal group.

10. The switching power supply according to any one of claims 1 to 6, wherein the control circuit comprises: several amplifiers having different characteristics for receiving the output voltage or a voltage associated with the output voltage at the respective input terminal, a selector for selecting one of the outputs of the several amplifiers based on the abrupt load change detection signal, and PWM control circuits for generating control signal groups based on the selected output, thereby controlling the operation of the main circuit based on the control signal group.

11. The switching power supply according to any one of claims 1 to 6, wherein the control circuit forcibly places the output circuit of the main circuit in a synchronous rectification state or in a synchronous rectification halt state in response to the abrupt load change detection signal being active.

12. The switching power supply comprising:
- a main circuit having a switching circuit for converting a DC input voltage to an AC voltage and an output circuit for rectifying the AC voltage to generate a DC output voltage;
- a control circuit for controlling the operation of the main circuit; and
- an abrupt load change detector circuit for detecting an abrupt change in the load current supplied from the main circuit, the abrupt load change detector circuit which includes:
  - a first to third filters for receiving the output voltage;
  - a first comparator for receiving the output of the first filter at one input terminal and the output of the second filter at the other input terminal thus generating a first abrupt load change detection signal based on these outputs; and
  - a second comparator for receiving the output of the first filter at one input terminal and the output of the third filter at the other input terminal thus generating a second abrupt load change detection signal based on these outputs.

13. The switching power supply according to claim 12, wherein the output voltage levels of the first and second filters in normal state differ from each other and the output voltage levels of the first and third filters in normal state differ from each other.

14. The switching power supply according to claim 12 or 13, wherein the control circuit includes an amplifier for receiving the output voltage or a voltage associated with the output voltage at its input terminal and
wherein the abrupt load change detector circuit further comprises means for varying the level at the input terminal of the amplifier in one direction in response to activation of the first abrupt load change detection signal and varying the level at the input terminal of the amplifier in the opposite of the one direction in response to activation of the second abrupt load change detection signal.

15. The switching power supply comprising:
- a main circuit having a switching circuit for converting a DC input voltage to an AC voltage and an output circuit for rectifying the AC voltage to generate a DC output voltage;
- a control circuit for controlling the operation of the main circuit; and
- an abrupt load change detector circuit for detecting an abrupt change in the load current supplied from the main circuit, the abrupt load change detector circuit which includes:
  - a first filter and a second filter for receiving the output voltage;
  - an operational amplifier for amplifying the output voltage level difference between the first and second filters;
  - a first comparator for activating the first abrupt load change detection signal in response to the output of the operational amplifier which exceeds the first threshold voltage; and
  - a second comparator for activating the second abrupt load change detection signal in response to the output of the operational amplifier which exceeds the second threshold voltage.

16. The switching power supply according to claim 15, wherein both of the first and second threshold voltages are associated with the output voltage.

17. The switching power supply according to claim 16, wherein the first and second threshold voltages are either lower or higher than the output voltage level of the operational amplifier in normal state.

18. The switching power supply according to claim 16, wherein the first threshold voltage is higher than the output voltage level of the operational amplifier in the low-level normal state and the second threshold voltage is lower than the output voltage level of the operational amplifier in the high-level normal state.

19. The switching power supply according to claim 15, wherein the first threshold voltage is higher than the output voltage level of the operational amplifier in the low-level normal state and the second threshold voltage is lower than the output voltage level of the operational amplifier in the high-level normal state.

20. The switching power supply according to claim 19 or 18, wherein the control circuit has an amplifier for receiving the output voltage or a voltage associated with the output voltage at its input terminal and that the abrupt load change detector circuit further comprises means for varying the level at the input terminal of the amplifier in one direction in response to activation of the first abrupt load change detection signal and varying the level at the input terminal of the amplifier in the opposite of the one direction in response to activation of the second abrupt load change detection signal.

21. The switching power supply according to claim 15, wherein the first and second threshold voltages are either lower or higher than the output voltage level of the operational amplifier in normal state.

22. The switching power supply according to claim 21 or 17, wherein the control circuit has at least an amplifier for receiving the output voltage or a voltage associated with the output voltage at its input terminal and that the abrupt load change detector circuit further comprises means for varying the level at the input terminal of the amplifier at a first rate in one direction in response to activation of the first abrupt load change detection signal and varying the level at the input terminal of the amplifier at a second rate in the one direction in response to activation of the second abrupt load change detection signal.

* * * * *